(12) United States Patent
Park

(10) Patent No.: US 11,835,411 B2
(45) Date of Patent: Dec. 5, 2023

(54) SERIES ELASTIC ACTUATOR

(71) Applicant: LG ELECTRONICS INC., Seoul (KR)

(72) Inventor: Huichang Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 240 days.

(21) Appl. No.: 16/877,723

(22) Filed: May 19, 2020

(65) Prior Publication Data

US 2021/0199522 A1 Jul. 1, 2021

(30) Foreign Application Priority Data

Dec. 26, 2019 (KR) .......................... 10-2019-0175381

(51) Int. Cl.
  *G01L 3/14* (2006.01)
  *H02K 7/08* (2006.01)
  *B25J 17/00* (2006.01)

(52) U.S. Cl.
  CPC ............. *G01L 3/1407* (2013.01); *B25J 17/00* (2013.01); *H02K 7/08* (2013.01)

(58) Field of Classification Search
  CPC .......... F16H 55/12; F16H 55/14; F16H 55/18; B25J 17/00; B25J 13/085; H02K 7/08
  See application file for complete search history.

(56) References Cited

U.S. PATENT DOCUMENTS

| | | | |
|---|---|---|---|
| 1,308,160 A * | 7/1919 | Brinton | .................. F16H 55/06 74/460 |
| 2,372,625 A | 3/1945 | Denton | |
| 3,252,696 A * | 5/1966 | Friedel | .................... F16C 11/12 403/291 |
| 3,897,859 A | 8/1975 | Norcia | |
| 6,169,346 B1 * | 1/2001 | Nakamura | ........... H02K 7/1166 74/411 |
| 6,293,022 B1 * | 9/2001 | Chino | .................. B62D 15/023 33/203.18 |
| 6,905,004 B2 | 6/2005 | Oppitz et al. | |
| 9,556,949 B2 * | 1/2017 | Kozilek | .............. F16H 57/0006 |

(Continued)

FOREIGN PATENT DOCUMENTS

| | | |
|---|---|---|
| KR | 10-2017-0037442 | 4/2017 |
| WO | WO 2017/052223 | 3/2017 |
| WO | WO 2020/259964 | 12/2020 |

OTHER PUBLICATIONS

U.S. Office Action dated Oct. 12, 2021 issued in U.S. Appl. No. 16/877,687.

(Continued)

*Primary Examiner* — Charles A Fox
*Assistant Examiner* — Gregory T Prather
(74) *Attorney, Agent, or Firm* — KED & ASSOCIATES, LLP

(57) ABSTRACT

A series elastic actuator includes a gear configured to rotate, an output body configured to rotate by the gear, and an elastic body connecting the gear and the output body. The elastic body may include an outer ring fastened to the gear, an inner ring positioned inside the outer ring and fastened to the output body, and a deformation portion connecting the outer ring and the inner ring and deforming elastically. The elastic body may include a plurality of elastic bodies connected in parallel or in series.

21 Claims, 16 Drawing Sheets

(56) References Cited

U.S. PATENT DOCUMENTS

| | | |
|---|---|---|
| 9,676,104 B2 | 6/2017 | Sutton, Jr. |
| 9,772,240 B2 * | 9/2017 | Hulse ..................... F16F 1/027 |
| 2002/0169045 A1 * | 11/2002 | Kodama ................. F16H 55/14 |
| | | 474/161 |
| 2014/0209781 A1 | 7/2014 | Weber |
| 2015/0075311 A1 | 3/2015 | Kanzaki |
| 2020/0233448 A1 | 7/2020 | Chen |
| 2021/0033185 A1 * | 2/2021 | Aguinaldo ............... G02B 7/08 |
| 2021/0102612 A1 | 4/2021 | Cornell |
| 2021/0188412 A1 | 6/2021 | Kontopoulos |
| 2021/0199159 A1 | 7/2021 | Park |
| 2021/0199522 A1 | 7/2021 | Park |
| 2021/0239188 A1 | 8/2021 | Kontopoulos |

OTHER PUBLICATIONS

U.S. Notice of Allowance dated Jan. 28, 2022 issued in U.S. Appl. No. 16/877,687.
United States Office Action dated Sep. 8, 2022 issued in co-pending related U.S. Appl. No. 16/877,763.
U.S. Appl. No. 16/877,687, filed May 19, 2020.
U.S. Appl. No. 16/877,723, filed May 19, 2020.
U.S. Appl. No. 16/877,763, filed May 19, 2020.

* cited by examiner

SERIES ELASTIC ACTUATOR

CROSS-REFERENCE TO RELATED APPLICATION(S)

This application claims priority under 35 U.S.C. § 119 to Korean Application No. 10-2019-0175381 filed on Dec. 26, 2019, whose entire disclosure is hereby incorporated by reference.

BACKGROUND

1. Field

The present disclosure relates to a series elastic actuator.

2. Background

A series elastic actuator (SEA) is generally a driver in which a predetermined elastic body is connected in series to a drive shaft of a power source such as a motor. The coupled elastic body allows the driver to flexibly adapt to external forces. By measuring a displacement of the elastic body, a torque of the driver may be determined, and a driving rigidity may be variably controlled by using the torque to the feedback control of the driver.

Series elastic actuators generally use torsion springs or tension-compression springs for torque measurement. However, in such a series elastic actuator, a reduction gear and a spring may be provided separately, and additional space and a certain configuration and arrangement of the spring may be required. In addition, rigidity of the spring may be difficult to adjust when the series elastic actuator is manufactured to be a predetermined size or less.

KR 10-2017-0037442 A, published Apr. 4, 2017, discloses an arc-shaped compression spring module for a series elastic actuator.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
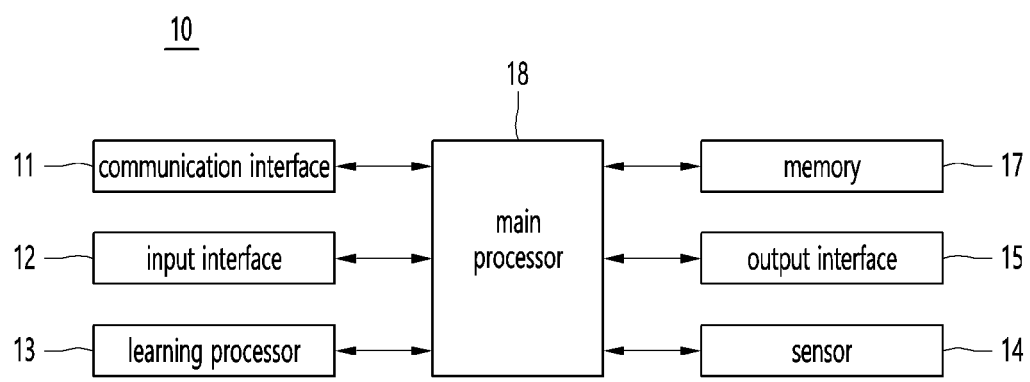
FIG. 1 is a block diagram of an artificial intelligence (AI) device for a robot according to an embodiment.

A robot may be a machine that automatically processes or operates a given task by the robot's own ability. A robot capable of recognizing an environment and performing a self-determination operation may be referred to as an intelligent robot. Robots may be classified into industrial robots, medical robots, home robots, military robots, and other types according to the robot's use, purpose, or field.

A robot may include a driving assembly, which may include an actuator or a motor to perform various physical operations such as moving a robot joint. A driving assembly in a movable robot may include a wheel, a brake, a propeller, etc. to travel on a floor or ground surface or to fly in the air.

<Artificial Intelligence (AI)>

Artificial intelligence refers to the field of studying artificial intelligence or methodology for making artificial intelligence. Machine learning refers to the field of defining various issues dealt with in the field of artificial intelligence and studying methodology for solving the various issues. Machine learning is an algorithm that enhances the performance of a certain task through a steady or prolonged experience with the certain task.

An artificial neural network (ANN) is a model used in machine learning of problem-solving ability which is composed of artificial neurons (nodes) that form a network by synaptic connections. The ANN may be defined by a connection pattern between neurons in different layers, a learning process to update model parameters, and an activation function to generate an output value.

The ANN may include an input layer, an output layer, and optionally one or more hidden layers. Each layer includes one or more neurons, and the ANN may include a synapse that links neurons to neurons. In the ANN, each neuron may output a function value of an activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the ANN may be to determine the model parameters that minimize a loss function. The loss function may be used as an index to determine optimal model parameters in the learning process of the ANN.

Machine learning may be classified into supervised learning, unsupervised learning, and reinforcement learning according to a learning method. Supervised learning may refer to a method of learning an ANN in a state where a label for learning data is given, and the label may mean the correct answer (or result value) that the ANN must infer when the learning data is input to the ANN. Unsupervised learning may refer to a method of learning an ANN in a state where a label for learning data is not given. Reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning. Deep learning is part of machine learning. In the following, machine learning is used to mean deep learning.

<Self-Driving>

Self-driving refers to a technique of driving for oneself. For example, a self-driving vehicle refers to a vehicle that travels without an operation of a user or with a minimum operation of a user. The self-driving vehicle may include a technology that maintains a lane while driving, a technology that automatically adjusts a speed (e.g., adaptive cruise control), a technology that automatically travels along a predetermined route, and a technology that automatically sets and travels a route when a destination is set. The self-driving vehicle may be a vehicle having only an internal combustion engine, a hybrid vehicle having an internal combustion engine and an electric motor together, or an electric vehicle having only an electric motor. The self-driving vehicle is not limited to automobiles but may also be a train, a motorcycle, etc. The self-driving vehicle may be regarded as a robot having a self-driving function.

FIG. 1 illustrates an artificial intelligence (AI) device 10, which may be, include, or be coupled to a robot according to an embodiment. The AI device 10 may be implemented by a stationary device or a mobile device, such as a TV, a projector, a mobile phone, a smartphone, a laptop, a desktop computer, a notebook, a digital broadcasting terminal, a personal digital assistant (PDA), a portable multimedia player (PMP), a navigation device, a tablet PC, a wearable device, a wearable assistive device or exoskeleton, a set-top box (STB), a DMB receiver, a radio, a washing machine, a refrigerator, a home appliance, a digital signage, a robot, a vehicle, etc.

The AI device 10 may include a communication interface 11, an input interface 12, a learning processor 13, a sensor 14, an output interface 15, a memory 17, and a main processor 18. The communication interface 11 may transmit and receive data to and from external devices such as other AI devices 10a to 10e (FIG. 3) and an AI server 20 (FIGS. 2-3) by using wire/wireless communication technology. For example, the communication interface 11 may transmit and receive sensor information, a user input, a learning model, and a control signal to and from external devices. The wire/wireless communication technology used by the communication interface 11 may include Global System for Mobile communication (GSM), Code Division Multi Access (CDMA), Long Term Evolution (LTE), 5G, Wireless LAN (WLAN), Wireless-Fidelity (Wi-Fi), Bluetooth™, Radio Frequency Identification (RFID), Infrared Data Association (IrDA), ZigBee, Near Field Communication (NFC), etc.

The input interface 12 may acquire various kinds of data. The input interface 12 may include a camera to input a video or image signal, a microphone to receive an audio signal, and a user input interface to receive information or commands from a user. The camera or the microphone may be treated as a sensor, and the signal acquired from the camera or the microphone may be referred to as sensing data or sensor information.

The input interface 12 may acquire learning data for model learning and input data to be used when an output is acquired by using a learning model. The input interface 12 may acquire raw input data. The main processor 18 or the learning processor 13 may extract an input feature by preprocessing the input data.

The learning processor 13 may learn a model composed of an artificial neural network (ANN) by using the acquired learning data. The learned artificial neural network may be referred to as a learning model. The learning model may be used to infer a result value for new input data rather than learning data, and the inferred result value may be used as a basis to determine whether to perform a certain operation.

Figure 2:
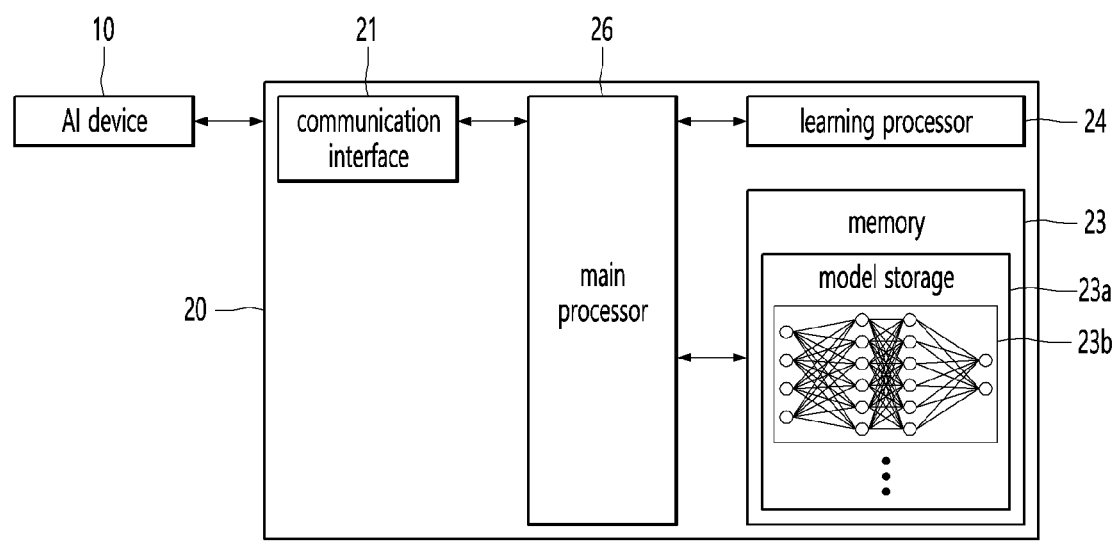
FIG. 2 is a block diagram of an AI server including the AI device of FIG. 1 and connected to a robot according to an embodiment.

The learning processor 13 may perform AI processing together with a learning processor 24 of the AI server 20 (FIG. 2). The learning processor 13 may include a learning memory integrated or implemented in the AI device 10. Alternatively, the learning processor 13 may be implemented by using a memory 17, an external memory directly connected to the AI device 10, or a memory held in an external device.

The sensor 14 may acquire at least one of internal information about the AI device 10, ambient environment information about the AI device 10, or user information by using various sensors. The sensor 14 may include at least one sensing device. For example, the sensor 14 may include a proximity sensor, an illuminance or light sensor, an acceleration sensor, a magnetic sensor or hall sensor, a gyro sensor, an inertial sensor, an RGB sensor, an IR sensor, a PIR sensor, a fingerprint recognition sensor, an ultrasonic sensor, an optical sensor, a microphone, a lidar sensor or laser sensor, and/or a radar.

The output interface 15 may generate a visual, auditory, and/or haptic output. The output interface 15 may include a display to output time information or other data, a speaker to output auditory information, and a haptic module to output haptic information.

The memory 17 may store data that supports various functions of the AI device 10. For example, the memory 17 may store input data acquired by the input interface 12, learning data, a learning model, a learning history, etc.

The main processor 18 may determine at least one executable operation of the AI device 10 based on information determined or generated by using a data analysis algorithm or a machine learning algorithm. The main processor 18 may control the other components of the AI device 10 (i.e., the input interface 12, the learning processor 13, the memory 17, the output interface 15, and the sensor 14) to execute the determined executable operation.

The main processor 18 may request, search, receive, or utilize data of the learning processor 13 or the memory 17. The main processor 18 may control the components of the AI device 10 to execute a predicted operation or an operation determined to be desirable among the at least one executable operation.

When a connection of an external device is required to perform the determined operation, the main processor 18 may generate a control signal to control the external device and may transmit the generated control signal to the external device. The main processor 18 may acquire intention information for a user input and may determine a user's requirements based on the acquired intention information. The main processor 18 may acquire intention information corresponding to the user input by using at least one of a speech to text (STT) engine to convert speech input into a text string or a natural language processing (NLP) engine to acquire intention information of a natural language.

At least one of the STT engine or the NLP engine may be configured as an artificial neural network, at least part of which is learned according to the machine learning algorithm. At least one of the STT engine or the NLP engine may be learned by the learning processor 13 of the AI device 10, the learning processor 24 of the AI server 20 (FIG. 2), or by their distributed processing.

The main processor 18 may collect history information including operation contents of an AI apparatus 100 (FIG. 4) or a user's feedback on the operation. The main processor 18 may store the collected history information in the memory 17 or the learning processor 13 or transmit the collected history information to an external device such as the AI server 20. The collected history information may be used to update the learning model.

The main processor 18 may control at least some of the components of AI device 10 so as to drive an application program stored in the memory 17. Furthermore, the main processor 18 may operate two or more of the components included in the AI device 10 in combination so as to drive an application program.

Figure 4:
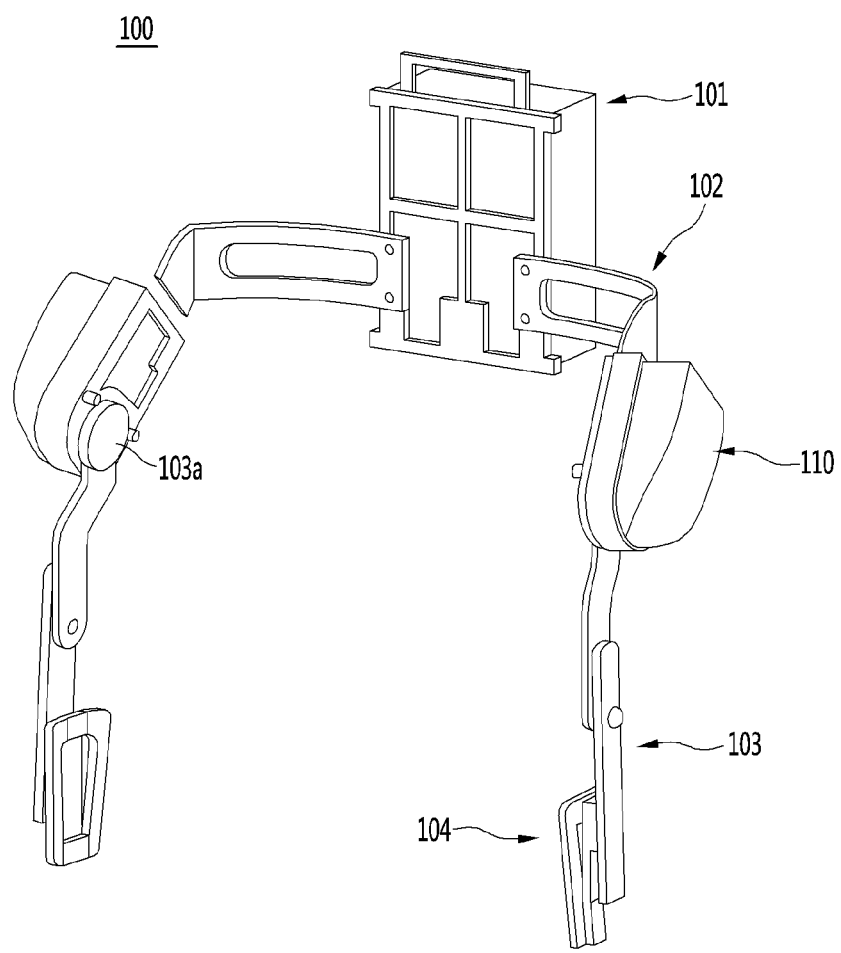
FIG. 4 is a perspective view of a robot including a series elastic actuator according to an embodiment.

Referring to FIG. 2, the AI server 20 may refer to a device that learns an artificial neural network by using a machine learning algorithm or uses a learned artificial neural network. The AI server 20 may be connected to a robot or other AI apparatus 100 (FIG. 4). The AI server 20 may include a plurality of servers to perform distributed processing, or may be defined as a 5G network. The AI server 20 may be included as a partial configuration of the AI device 10, and may perform at least part of the AI processing together with the AI device 10.

The AI server 20 may include a communication interface 21, a memory 23, a learning processor 24, and a main processor 26. The communication interface 21 may transmit and receive data to and from an external device such as the AI device 10, and may have a similar implementation as the communication interface 11 of the AI device 10 (FIG. 1).

The memory 23 may include a model storage 23a. The model storage 23a may store a learning or learned model (or an artificial neural network 23b) through the learning processor 24. The learning processor 24 may learn the artificial neural network 23b by using the learning data. The learning model may be used in a state of being mounted on the AI server 20 of the artificial neural network, or may be used in a state of being mounted on an external device such as the AI device 10.

The learning model may be implemented in hardware, software, or a combination of hardware and software. If all or part of the learning models are implemented in software, one or more instructions that constitute the learning model may be stored in the memory 23. The processor 26 may infer a result value for new input data by using the learning model and may generate a response or a control command based on the inferred result value.

Figure 3:
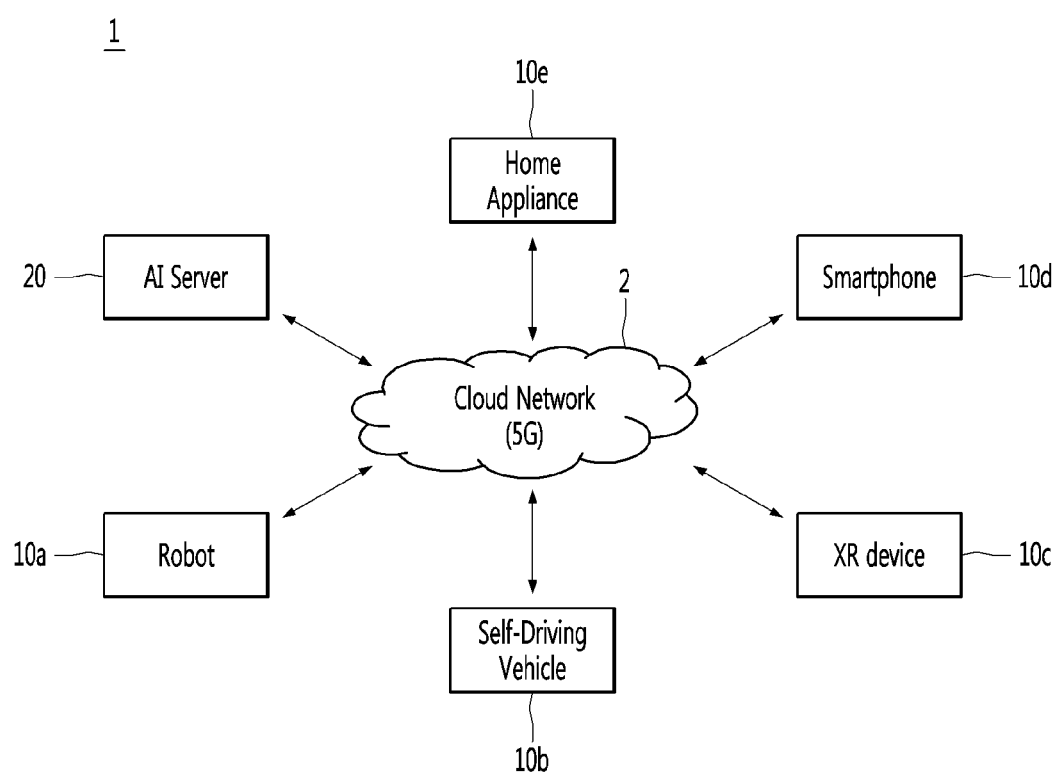
FIG. 3 illustrates an AI system including the AI server of FIG. 2 according to an embodiment.

Referring to FIG. 3, an AI system 1 may include at least one of an AI server 20, a robot 10a, a self-driving vehicle 10b, an XR device 10c, a smartphone 10d, or a home appliance 10e that is connected to a cloud network 2. The robot 10a, the self-driving vehicle 10b, the XR device 10c, the smartphone 10d, or the home appliance 10e to which AI technology is applied may be referred to as AI devices 10a to 10e.

The cloud network 2 may refer to a network that forms part of a cloud computing infrastructure or exists in a cloud computing infrastructure. The cloud network 2 may be configured by using a 3G network, a 4G or LTE network, or a 5G network.

The AI devices 10a to 10e and the AI server 20 configuring the AI system 1 may be connected to each other through the cloud network 2. Each of the AI devices 10a to 10e and 20 may communicate with each other through a base station and/or may directly communicate with each other without using a base station.

The AI server 20 may include a server that performs AI processing and a server that performs operations on big data. The AI server 20 may be connected to at least one of the AI devices 10a to 10e of the AI system 1 through the cloud network 2, and may assist at least part of AI processing of the connected AI devices 10a to 10e.

The AI server 20, instead of the AI devices 10a to 10e, may learn the artificial neural network according to the machine learning algorithm, and may directly store the learning model or transmit the learning model to the AI devices 10a to 10e. The AI server 20 may receive input data from the AI devices 10a to 10e, may infer a result value for the received input data by using the learning model, may generate a response or a control command based on the inferred result value, and may transmit the response or the control command to the AI devices 10a to 10e. Alternatively, the AI devices 10a to 10e may infer the result value for the input data by directly using the learning model, and may generate the response or the control command based on the inferred result value.

Hereinafter, various embodiments of the AI devices 10a to 10e to which the above-described technology is applied will be described. The AI devices 10a to 10e identified in FIG. 3 may be regarded as a specific embodiment of the AI device 10 of FIG. 1.

<AI+Robot>

The robot 10a, to which the AI technology is applied, may be implemented as a guide robot, a carrying robot, a cleaning robot, a wearable robot, an entertainment robot, a pet robot, an unmanned flying robot, etc. The robot 10a may include a robot control module to control an operation. The robot control module may refer to a software module or a chip implementing the software module by hardware.

The robot 10a may acquire state information about the robot 10a by using sensor information acquired from various kinds of sensors, may detect (recognize) surrounding environment and objects, may generate map data, may determine a route and a travel plan, may determine a response to user interaction, and/or may determine an operation. The robot 10a may use the sensor information acquired from at least one of a lidar, radar, or camera so as to determine the travel route and the travel plan.

The robot 10a may perform the above-described operations by using the learning model composed of at least one artificial neural network. For example, the robot 10a may recognize the surrounding environment and objects therein by using the learning model, and may determine an operation by using the recognized surrounding information or object information. The learning model may be learned directly from the robot 10a or may be learned from an external device such as the AI server 20.

The robot 10a may perform the determined operation by generating a result by directly using the learning model. The sensor information may be transmitted to the external device such as the AI server 20, and the generated result may be received to perform the operation. The robot 10a may use at least one of the map data, the object information detected from the sensor information, or the object information acquired from the external device (e.g., the AI server 20) to determine the travel route and the travel plan, and may control a driving unit or assembly (e.g., a wheel) such that the robot 10a travels along the determined travel route and travel plan.

The map data may include object identification information about various objects arranged in a space in which the robot 10a moves. For example, the map data may include object identification information about fixed objects such as walls and doors and movable objects such as pollen, chairs, and desks. The object identification information may include a name, a type, a distance, and a position.

The robot 10a may perform the operation or travel by controlling the driving unit based on a control/interaction of the user. The robot 10a may acquire intention information of the interaction due to the user's operation or speech utterance, determine a response based on the acquired intention information, and perform the operation.

Figure 5:
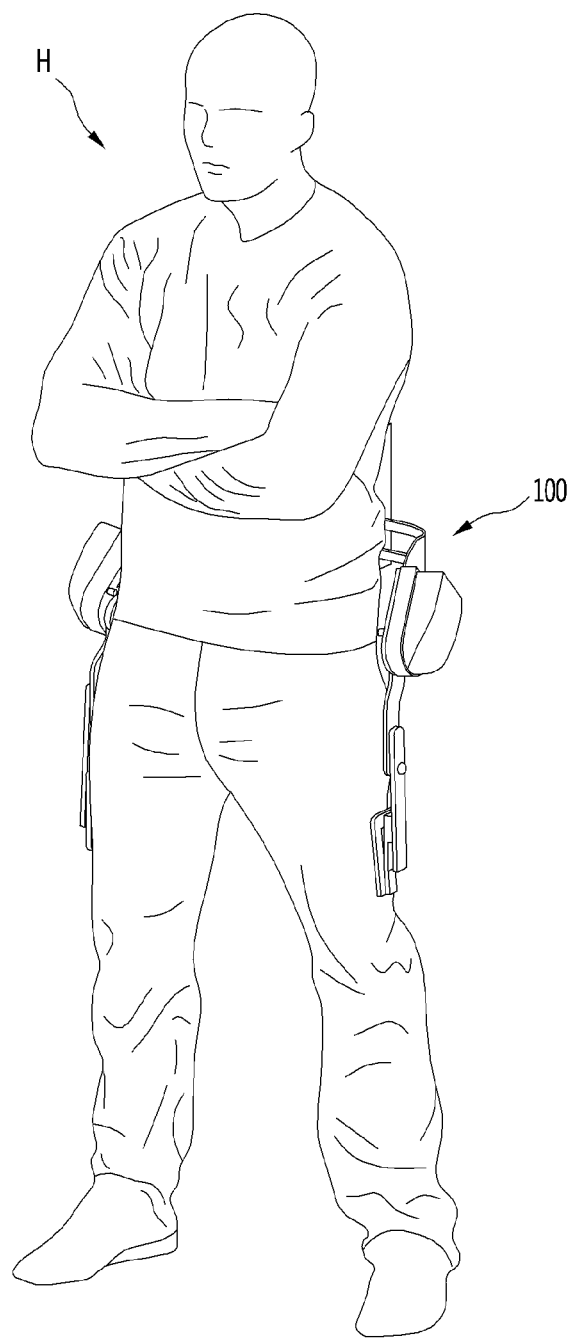
FIG. 5 illustrates the robot of FIG. 4 worn by a user.

Referring to FIGS. 4-5, an AI Apparatus 100 may be implemented as a robot (e.g., the robot 10a of FIG. 3). For convenience of description, the AI Apparatus 100 will be referred to as a robot 100. The robot 100 may be a wearable robot or exoskeleton as an example, but embodiments disclosed herein are not limited thereto.

The robot 100 may include a main body 101, a connecting frame 102, a series elastic actuator (SEA) or a SEA 110, a movable portion or frame 103 (a limb, arm, leg, etc.), and a mounting portion or frame 104.

The main body 101 may be configured to be worn behind a wearer's or user's body H, such as behind a back or pelvis of the body H. The main body 101 may include a housing that houses a battery, electrical components or circuitry (a printed circuit board, wiring, etc.), and a controller to control an operation of the robot 100 therein.

The connecting frame 102 may connect the main body 101 and the SEA 110. There may be a pair of connecting frames 102 connected to first and second sides (i.e., left and right sides) of the main body 101 and connected to a pair of SEAs 110.

The connecting frame 102 may bend or curve forward along an outer contour or circumference of the wearer's body H. For example, the connecting frame 102 may have a U-shape or inclined |_|-shape. An end of the connecting frame 102 coupled to the side of the main body 101 may face toward a side (i.e., a left or right side), and an end of the connecting frame 102 coupled to the SEA 110 may face toward a front.

There may be one SEA 110 at both sides of the wearer's body H (e.g., at or around each hip joint of the body H). The SEA 110 may be hingedly connected to the connecting frame 102 so that the user may freely spread and close his legs (i.e., abduction and adduction) while wearing the robot 100.

The movable frame 103 may be rotatably connected to the SEA 110. The movable frame 103 may extend to be long downward and forward in a direction toward a lower body (i.e., along a leg). The moveable frame 103 may be connected to the SEA 110 via a connecting portion or joint 103a provided at an upper end of the movable frame 103. The movable frame 103 may rotate about the joint 103a.

The moveable frame 103 may be optionally comprised of an upper frame or section and a lower frame or section that are moveably connected. The upper frame may rotate about the joint 103a, which may correspond to a hip joint. The lower frame may be slideably coupled to the upper frame so as to provide an adjustable length, or alternatively, the lower frame may be rotatably coupled to the upper frame so as to allow a more customized fit on the user's thigh. As another alternative, the upper frame of the moveable frame 103 may have a length corresponding to a user's thigh, the lower frame of the moveable frame 103 may have a length corresponding to a user's calf, and the lower frame may be rotatably coupled to the upper frame via a joint, which may correspond to a knee joint.

The mounting frame 104 may be connected to the lower end (i.e., the lower frame) of the movable frame 103. The mounting frame 104 may be configured to be secured to the user's leg (e.g., a lower thigh). A configuration or method to secure the mounting frame 104 to the wearer's leg is not limited. For example, inner sides of the mounting frame 104 may include an elastic or deformable cushion to keep the moveable frame 103 on the leg, or the mounting frame 104 may include an optional belt or strap that wraps around the leg.

The SEA 110 may provide a driving force to rotate the moveable frame 103 with respect to the SEA 110. When the SEA 110 rotates the movable frame 103 upward, the mounting frame 104 may apply an upward force to the user's leg to assist the user in raising their legs or in standing. When the SEA 110 rotates the movable frame 103 downward, the mounting frame 104 may apply a downward force to the user's leg to assist the user in lowering the leg or in sitting. The SEA 110 may rotate the moveable frame 103 in various combinations of upward or downward to assist the user in bending, lifting, walking, or other movement.

Figure 6:
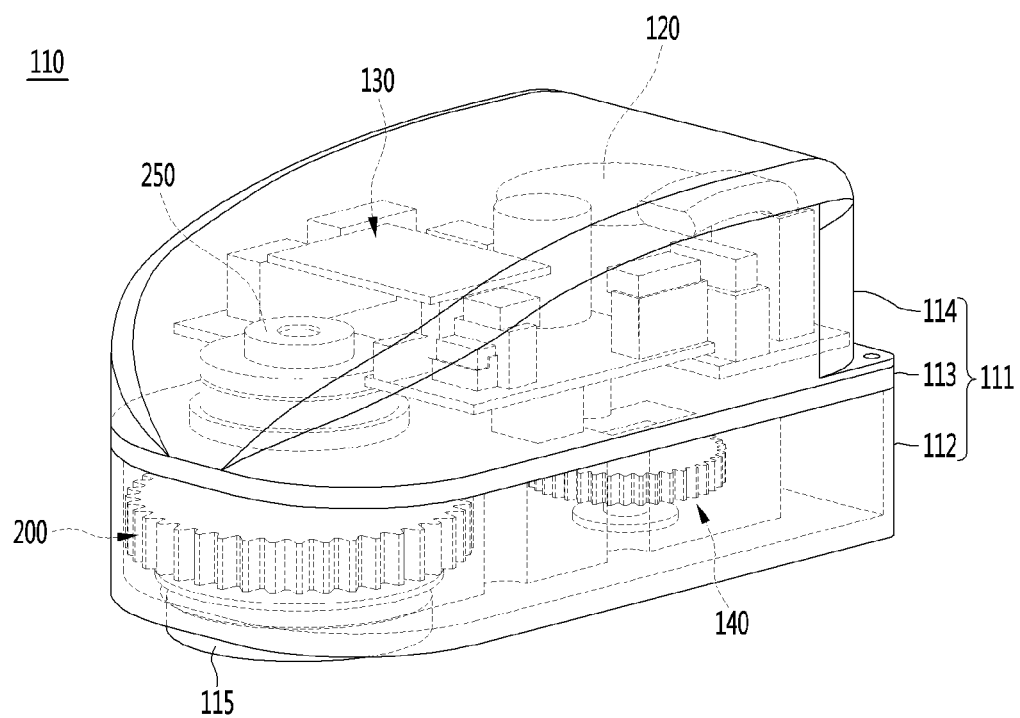
FIG. 6 illustrates an example of a series elastic actuator according to an embodiment.

Referring to FIG. 6, the SEA 110 may include a housing 111, a rotational power source 120, a power transmission portion or transmitter 140, and an elastic gear module or assembly 200. The housing 111 may form an outer appearance or surface of the SEA 110. The housing 111 may include a first case 112 and a second case 114.

The first case 112 and the second case 114 may each define openings that face each other. A partition plate 113 may be provided between the openings of the first case 112 and the second case 114 to partition an internal space of the housing 111 into a first space S1 and a second space S2. The first space S1 may be defined as space between the first case 112 and the partition plate 113, and the second space S2 may be defined as space between the second case 114 and the partition plate 113.

The partition plate 113 may have a plate shape and may be fastened (e.g., screwed, adhered, bolted, or pressed-fitted) to at least one of the first case 112 or the second case 114. As the partition plate 113 may cover the openings of each of the first case 112 and the second case 114, the partition plate 113 may be referred to as a cover.

The elastic gear module 200 may include a gear 210, an output body 220, an elastic body 230, a shaft 240, and an angle sensor 250. The power transmitter 140, the gear 210, the output body 220, the shaft, and the elastic body 230 may be provided in the first space S1 inside of the first case 112. The rotational power source 120, an electrical portion or assembly 130, and an angle sensor 250 may be provided in the second space S2 inside of the second case 113.

The rotational power source 120 may be a motor and may be embedded in the housing 111 between the second case 113 and the partition plate 114. A rotation shaft 121 of the rotational power source 120 may be connected to the power transmitter 140 through the partition plate 113. A through-hole 114a may be formed in the partition plate 113, and the rotation shaft 121 of the rotational power source 120 may pass through the through-hole 114a to couple to the power transmitter 140.

The rotational power source 120 may be electrically connected to the electrical assembly 130. The electrical assembly 130 may include at least one processor that controls the rotational power source 120. The electrical assembly 130 may be provided in the housing 111 between the second case 114 and the partition plate 113 so as to be easily connected to the rotational power source 120.

The power transmitter 140 may transmit the rotational force of the rotational power source 120 to the gear 210 of the elastic gear module 200. The power transmitter 140 may be provided in the housing 111 between the first case 112 and the partition plate 113 to be at a side of the housing 111 opposite to the rotational power source 120 with respect to the partition plate 113.

The power transmitter 140 may include a driving or prime gear 141 connected to the rotation shaft 121 of the rotational power source 120. The driving gear 141 may be a spur gear.

The driving gear 141 may be supported by a bearing 144 in a radial direction of the driving gear 141. At least one of the partition plate 113 or the first case 112 may include a bearing mounting portion or recess on which the bearing 144 is mounted. A first or upper side of the driving gear 141 may be connected to the rotation shaft 121, and a second or lower side of the driving gear 141 may be connected to the first case 112 by the bearing 144.

The power transmitter 140 may further include at least one intermediate gear 142 that transmits the rotational force from the driving gear 141 to the gear 210 of the elastic gear module 200. The intermediate gear 142 may be a spur gear. However, embodiments disclosed herein are not limited to having an intermediate gear 142, and alternatively, the intermediate gear 142 may be omitted, and the prime gear 141 may be directly engaged with the gear 210 of the elastic gear module 200.

The intermediate gear 142 may be supported by bearings 145 and 146 in a radial direction of the intermediate gear 142. At least one of the partition plate 113 or the first case 112 may be provided with a bearing mounting portion or recess on which the bearings 145 and 146 are mounted. A first or upper side of the intermediate gear 142 may be connected to the partition plate 113 via a cover side or upper bearing 145, and a second or lower side of the intermediate gear 142 may be connected to the first case 112 by a case side or lower bearing 146.

The elastic gear module 200 may receive the rotational force of the rotational power source 120 through the power transmitter 140, and the elastic gear module 200 may transmit the rotational force to an external load (e.g., the movable frame 103 of the robot 100 shown in FIG. 4). A portion of the elastic gear module 200 may be provided between the first case 112 and the partition plate 113, and another portion of the elastic gear module 200 may be located between the second case 113 and the partition plate 113. While the gear 210, the output body 220, the elastic body 230, and the shaft 240 may be provided in the first space S1 between the first case 112 and the partition plate 113, the angle sensor 250 may be provided in the second space S1 between the second case 114 and the partition plate 113.

The gear 210 of the elastic gear module 200 may alternatively be referred to as an output gear or driven gear. The gear 210 may be a spur gear engaged with intermediate gear 142 and provided between the first case 112 and the partition plate 113 to be provided on a same side of the partition plate 113 as the power transmitter 140. The power transmitter 140 and the gear 210 may be easily connected.

The gear 210 may be supported by a bearing 290 in a radial direction of the gear 210. The partition plate 113 may be provided with a bearing mounting portion or recess on which the bearing 290 is mounted, and the gear 210 may be connected to the partition plate 113 by the bearing 290. The bearing 290 may include an inner ring that rotates together with the gear 210, an outer ring fixed to a surface of the partition plate 113, and a rolling member (e.g., a ball or a roller) located between the inner ring and the outer ring.

The output body 220 may have a disc or circulate plate shape and may be rotated by the gear 210. The output body 220 may be connected to an external load (i.e., the movable frame 103 of the robot 100 shown in FIG. 4) via an output bracket 115. The output bracket 115 may have a disc or circular plate shape. The output bracket 115 may be provided outside of the housing 111 and may be fastened to the external load. As an example, the output bracket 115 may be fixed to the joint 103*a* (FIG. 4) of the movable frame 103 of the robot 100, but embodiments disclosed herein are not limited.

An opening may be formed in a bottom of the first case 112, and the output bracket 115 and the output body 220 may be fastened to each other through the opening. The output body 220 may be supported by a bearing 280 in a radial direction of the output body 220. The first case 112 may have a bearing mounting portion or recess on which the bearing 280 is mounted. The bearing 280 may include an inner ring rotating together with the output body 220, an outer ring fixed to an inner surface of the first case 112, and a rolling member (e.g., a ball or a roller) located between the inner ring and the outer ring.

The elastic body 230 may be provided between the gear 210 and the output body 220 to connect the gear 210 and the output body 220. The elastic body 230 may be fixed to the gear 210 and the output body 220, and the elastic body 230 may transmit the rotational force of the gear 210 to the output body 220.

The elastic body 230 may be configured to be elastically deformed in a circumferential direction of the elastic body 230 to allow the output body 220 to flexibly respond to the external load.

The shaft 240 may be integrally formed with the output body 220, or alternatively, the shaft 240 and the output body 220 may be formed separately and later coupled. The shaft 240 may extend from the output body 220 toward the elastic body 230 and the gear 210. The shaft 240 may pass through the elastic body 230 and the gear 210. The shaft 240 may extend along a rotation axis of the gear 210 and the output body 220, and the gear 210 and the output body 220 may rotate about the shaft 240.

The angle sensor 250 may be coupled to the shaft 240 and provided at a side of the gear 210 opposite to a side coupled to the output body 220. The angle sensor 250 may measure how much the shaft 240 has rotated. Data from the angle sensor 250 may be used to calculate a difference in movement between the gear 210 and the output body 220, and a deformation of the elastic body 230 may be determined so that an output force of the output body 220 may be calculated. The output force may be precisely controlled based on data from the angle sensor 250.

The angle sensor 250 may be provided in the second space S2 between the second case 114 and the partition plate 113 to be on the same side as the electrical assembly 130 with respect to the partition plate 113. The angle sensor 250 may be easily connected to the electrical assembly 130.

The shaft 240 may penetrate an opening 114*b* formed in the partition plate 113 to connect to the angle sensor 250. The electrical assembly 130 may be electrically connected to the angle sensor 250 and include at least one processor for feedback control of the rotational power source 120 based on sensing data transmitted from the angle sensor 250.

Figure 8:
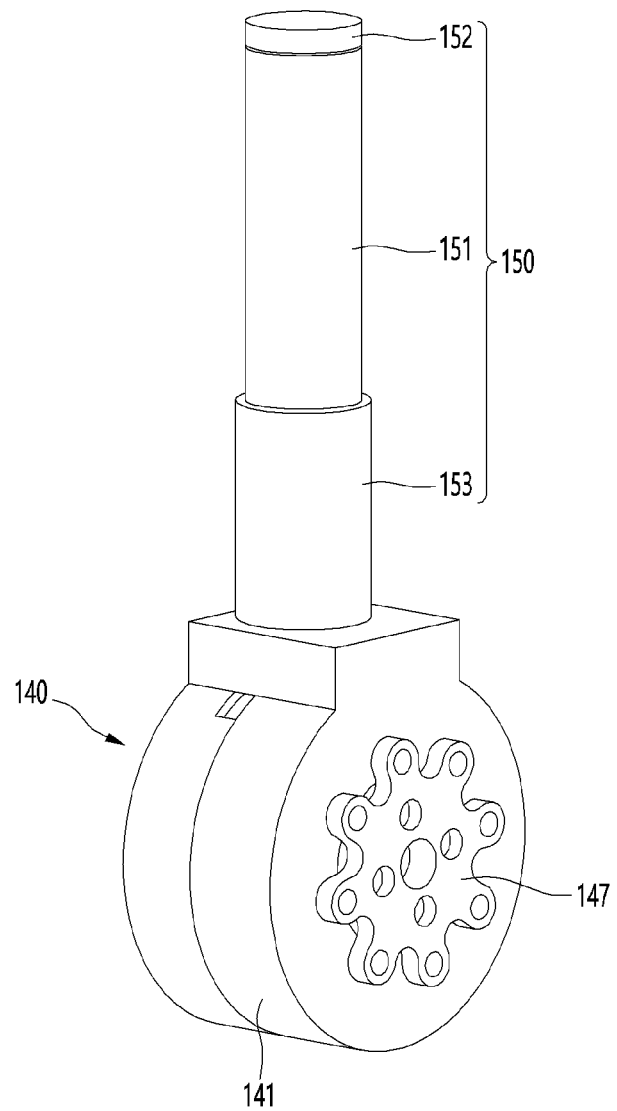
FIG. 8 illustrates another example of a series elastic actuator according to an embodiment.
Figure 9:
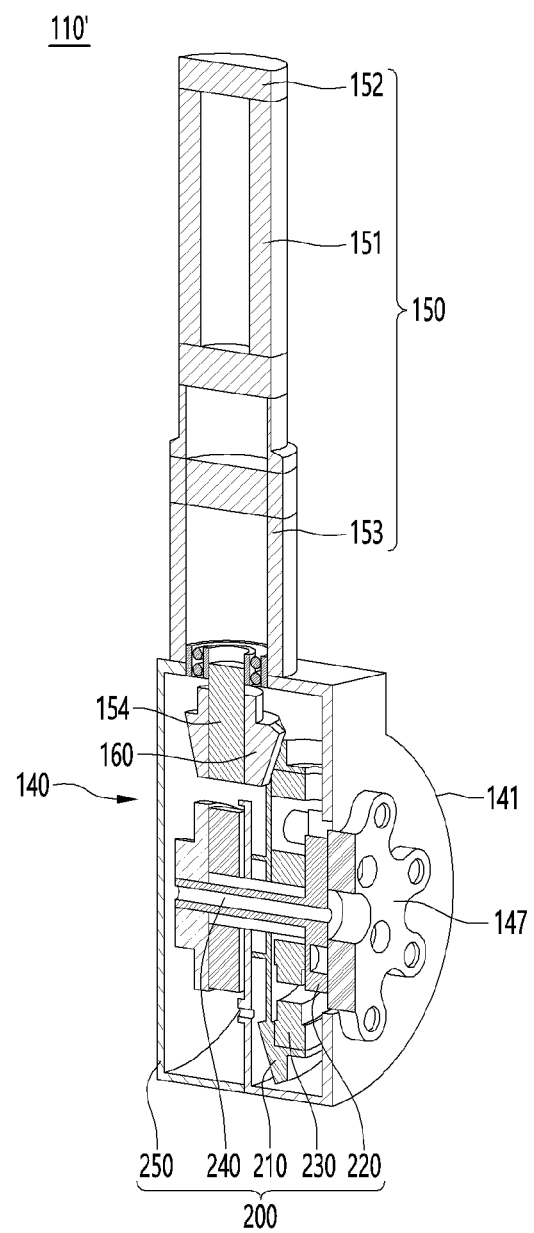
FIG. 9 is a cut perspective view of the series elastic actuator of FIG. 8.
Figure 10:
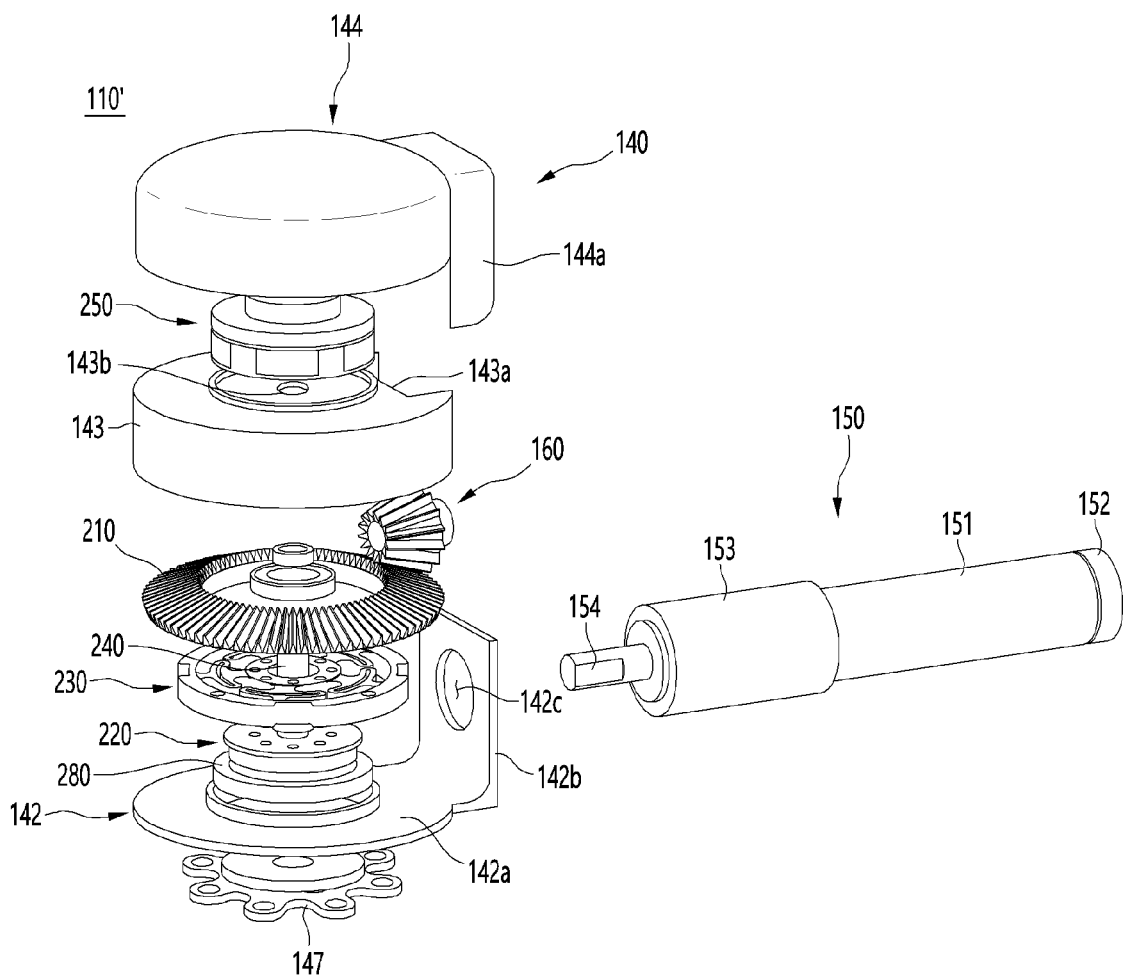
FIG. 10 is an exploded view of the series elastic actuator of FIG. 8.

Referring to FIGS. 8-10, an SEA 110' according to another example will be described. The SEA 110' may include a rotational power source 150 and an output module 140.

The rotational power source 150 may be a geared motor and may have an approximate shape that extends to be long in one direction. The rotational power source 150 may include a motor main body 151, an encoder 152 that senses rotation of the motor main body 151, and a gear head 153. The gear head 153 may include a plurality of gears to decelerate a rotation transmitted from the motor main body 151 and to transmit the rotation to a rotation shaft 154 protruding from the gear head 153. Since the configuration of a geared motor is a well-known technique, a detailed description thereof will be omitted.

The output module 140 may include a housing 141, a or prime driving gear 160, and an elastic gear module 200. The housing 141 may form an outer appearance of the output module 140 and have an approximate cylindrical shape. The housing 141 may include a first surface, the second surface opposite to the first surface, and a circumferential surface connecting the first surface and the second surface. The rotational power source 150 may be connected to the circumferential surface of the housing 141.

The housing 141 may include a cover 142, a first case 143, and a second case 144. The first case 143 and the second case 144 may be sequentially stacked on the cover 142. An inner space of the housing 141 may be partitioned into a first space S1 between the cover 142 and the first case 143 and a second space S2 between the first case 143 and the second case 144.

A gear 210, an output body 220, and an elastic body 230 may be provided between the cover 142 and the first case 143 in the first space S1. An angle sensor 250 may be provided between the first case 143 and the second case 144 in the second space S2.

The cover 142 may include a cover panel 142a and a connection panel 142b connected to the cover panel 142a. The cover panel 142a may have an approximate disc or ring shape. The cover panel 142a may form the first surface of the housing 141.

The connection panel 142b may be connected to the edge of the cover panel 142a and extend perpendicular to the cover panel 142a. The connection panel 142b may be provided with a connecting hole 142c through which the rotational power source 150 is inserted.

The first case 143 may have a cylindrical chamber shape in which a first surface (e.g., a bottom surface) is opened. The opened first surface of the first case 143 may be covered by the panel cover 142a of the cover 142. The first case 143 may form a portion of the circumferential surface of the housing 141. A second surface (e.g., an upper surface) of the first case 143 may be unopened and referred to as a partition plate partitioning the first space S1 and the second space S2.

A cutout 143a may be formed in the first case 143 at a position corresponding to the connection panel 142b of the cover 142. The cutout 143a may be formed by cutting a portion of a circumferential surface of the first case 143 and a portion of the second unopened surface of the first case 143. The driving gear 160 may be provided within the cutout 143a so as not to interfere with the first case 143.

The second case 144 may have a cylindrical chamber shape having one opened surface (e.g., a bottom surface of the second case 144 may be opened). The opened surface of the second case 144 may be covered by the first case 143. The second case 144 may form a portion of the circumferential surface and the second surface of the housing 141.

The second case 144 may be provided with a connecting portion or panel 144a surrounding an edge of the connection panel 142b of the cover 142. The connecting portion 144a may be provided around a portion of the second case 144. The connecting portion 144a may be connected to and be in contact with the edge of the cover panel 142a of the cover 142.

The connection portion 144a may form space with the cover panel 142a in which the driving gear 160 is received. The driving gear 160 may be a bevel gear, and may transmit a rotational force of the rotational power source 150 to the gear 210 of the elastic gear module 200. The driving gear 160 may be provided within the housing 141 in a space defined by the connecting portion 144a of the second case 144 and the cover panel 142a of the cover 142.

The driving gear 160 may be connected to the rotation shaft 154 of the rotational power source 150. The rotation shaft 154 may penetrate the connecting hole 142c defined in the cover 142 to couple to the driving gear 160.

The elastic gear module 200 may be provided in the housing 141. A portion of the elastic gear module 200 may be located between the cover 142 and the first case 143, while another portion of the elastic gear module 200 may be located between the first case 143 and the second case 144. The elastic gear module 200 may include a gear 210, an output body 220, an elastic body 230, and a shaft 240. The elastic gear module 200 may further include an angle sensor 250.

The gear 210 may be a bevel gear engaged with the driving gear 160. The gear 210 may be provided between the cover 142 and the first case 143. The output body 220 may be rotated by the gear 210 and have a substantial disc shape.

The output body 220 may be connected to an external load (e.g., movable frame 103 in FIG. 4) through an output bracket or a coupler 147. The output bracket 147 may be provided outside the housing 141 and may be fastened to the external load. For example, the output bracket 147 may be connected to the joint 103a of the movable frame 103 of the robot 100 of FIG. 4.

An opening may be defined in the cover panel 142a, and the output bracket 147 and the output body 220 may be fastened to each other through the opening The output body 220 may be supported by a bearing 280 in the radial direction. The cover panel 142a may be formed with a bearing mounting portion or recess in which the bearing 280 is mounted or received such that the output body 220 may be connected to the cover 142 via the bearing 280.

The elastic body 230 may be provided between the gear 210 and the output body 220. The elastic body 230 may connect the gear 210 and the output body 220, and the elastic body 230 may be fastened or coupled to the gear 210 and the output body 220. The elastic body 230 may transmit the rotational force of the gear 210 to the output body 220.

The elastic body 230 may be elastically deformed in a circumferential direction. The output body 220 may flexibly respond to an external load by the elastic body 230.

The shaft 240 may be coupled to the output body 220. The shaft 240 may be formed integrally with the output body 220, or alternatively the shaft 240 and the output body 220 may be formed separately and later combined. The shaft 240 may extend from the output body 220 toward the elastic body 230 and the gear 210 and penetrate the elastic body 230 and the gear 210.

The shaft 240 may be provided on a rotation axis of the gear 210 and the output body 220. The gear 210 and the output body 220 may rotate about the shaft 240.

The angle sensor 250 may be positioned at a side of the gear 210 that is opposite to a side of the gear facing the output body 220. The angle sensor 250 may be coupled to the shaft 240. The angle sensor 250 may detect an angle at which the shaft 240 rotates or an orientation of the shaft 140.

The angle sensor 250 may be provided between the first case 143 and the second case 144. The shaft 240 may be coupled to the angle sensor by passing through the opening portion 143b formed in the first case 143.

Figure 11:
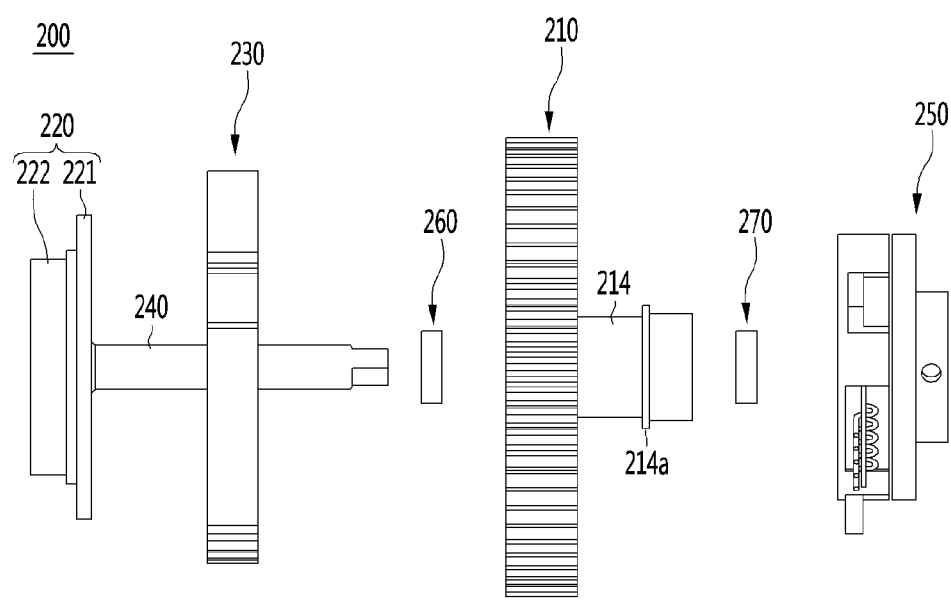
FIG. 11 is an exploded side view of an elastic gear module according to an embodiment.
Figure 12:
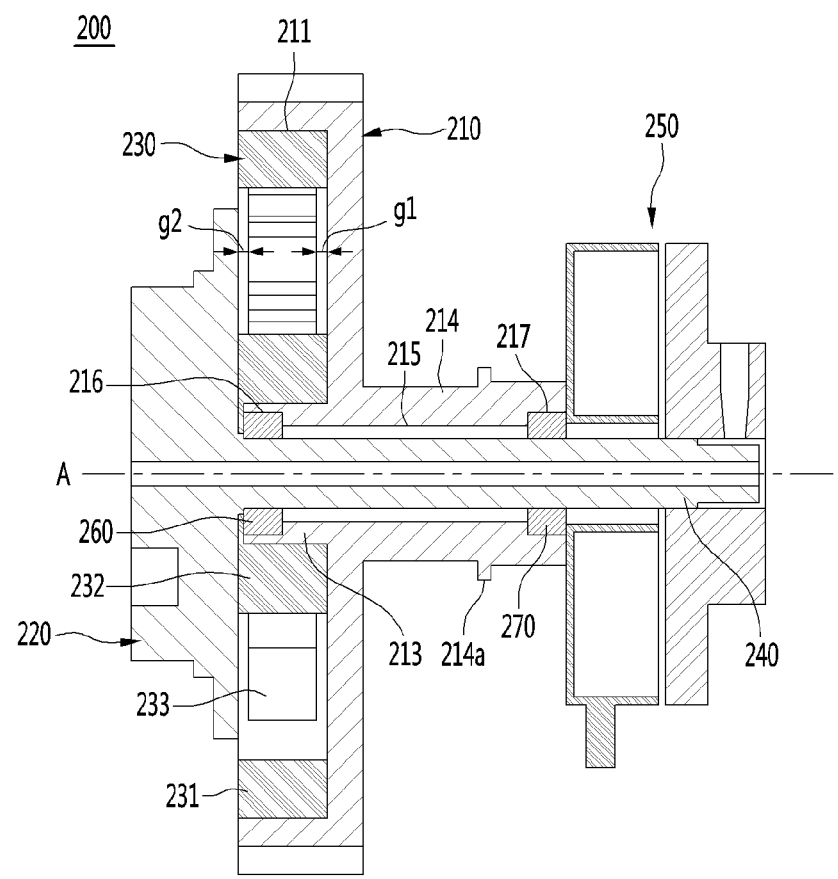
FIG. 12 is a cross-sectional view of the elastic gear module of FIG. 10.
Figure 13:
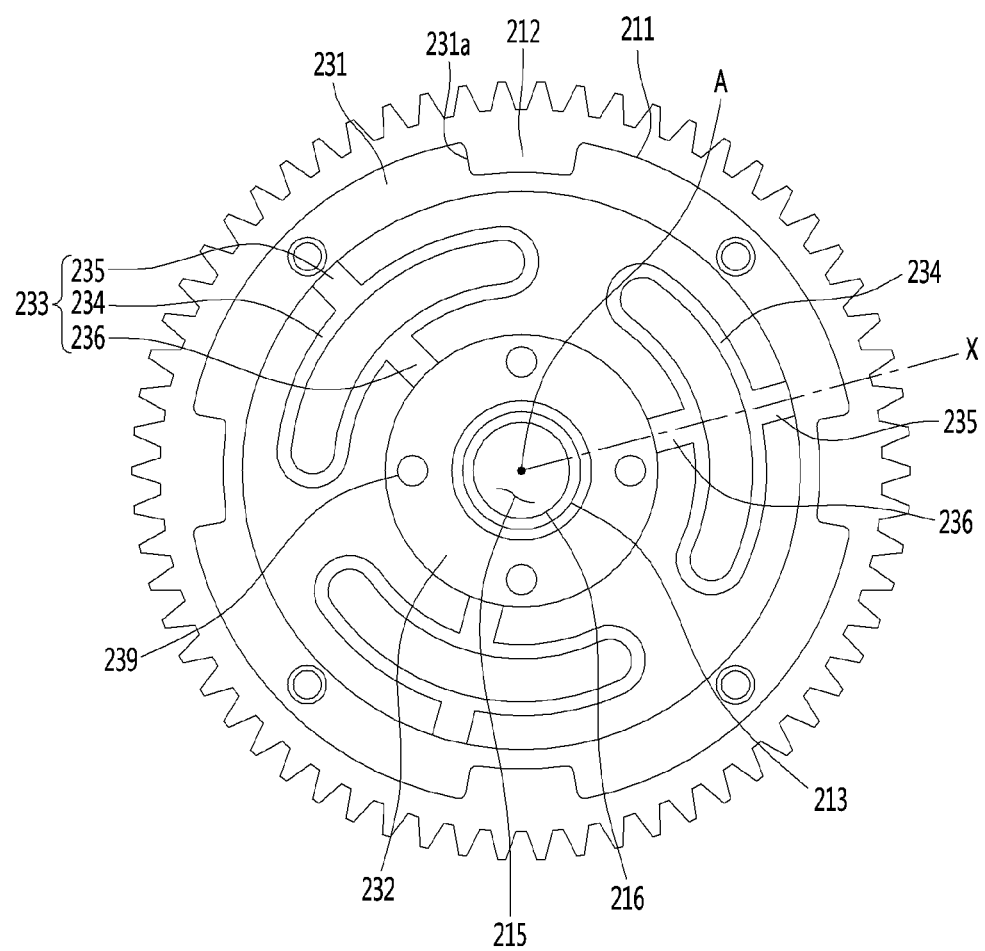
FIG. 13 is an enlarged view of an elastic body fastened to a gear according to an embodiment.

Referring to FIGS. 11-13, the elastic gear module 200 will be described in more detail. However, embodiments disclosed herein are not limited to such an elastic gear module. For example, the elastic gear modules described in U.S. Application Ser. No. 16/877,687, filed on May 19, 2020 and Ser. No. 16/877,763, filed on May 19, 2020 may be used in place of the elastic gear module 200.

A mounting recess 211 may be formed in the first surface of the gear 210, and the elastic body 230 may be mounted in the mounting recess 211. The elastic body 230 may not protrude past the first surface of the gear 210 in an axial direction of the gear 210, and may remain flush with the first surface of the gear 210 when provided in the mounting recess 211 to be compact.

A fitting or supporting portion 212 may be formed on an inner circumference of the mounting recess 211 to protrude radially inward. A plurality of fitting portions 212 may be formed to be spaced apart from each other in the circumferential direction by a predetermined interval.

An outer circumferential section or edge of the elastic body 230 may be formed with a fitting recess or opening 231a into which the fitting portion 212 is fitted. A plurality of fitting recesses 231a may be spaced apart from each other by the predetermined interval in the circumferential direction.

The fitting portion 212 may be tightly pressed-fit into the fitting recess 231a to be directly fastened to the gear 210. The elastic body 230 and the gear 210 may be fastened to each other without requiring a separate fastening member such as a bolt so that the elastic gear module 200 may be compact.

The gear 210 may be formed with a protruding portion or protrusion 214 which may be hollow. The protrusion 214 may protrude in an axial direction from a side of the gear 210 opposite to a side that is coupled to the elastic body 230 and have a hollow cylinder shape. The protrusion 214 may be formed at a center, and a rotation axis A of the gear 210 may pass through the protrusion 214. The protrusion 214 may protrude toward the angle sensor 250 such that an end of the protrusion 214 contacts or is provided adjacent to the angle sensor 250.

Figure 7:
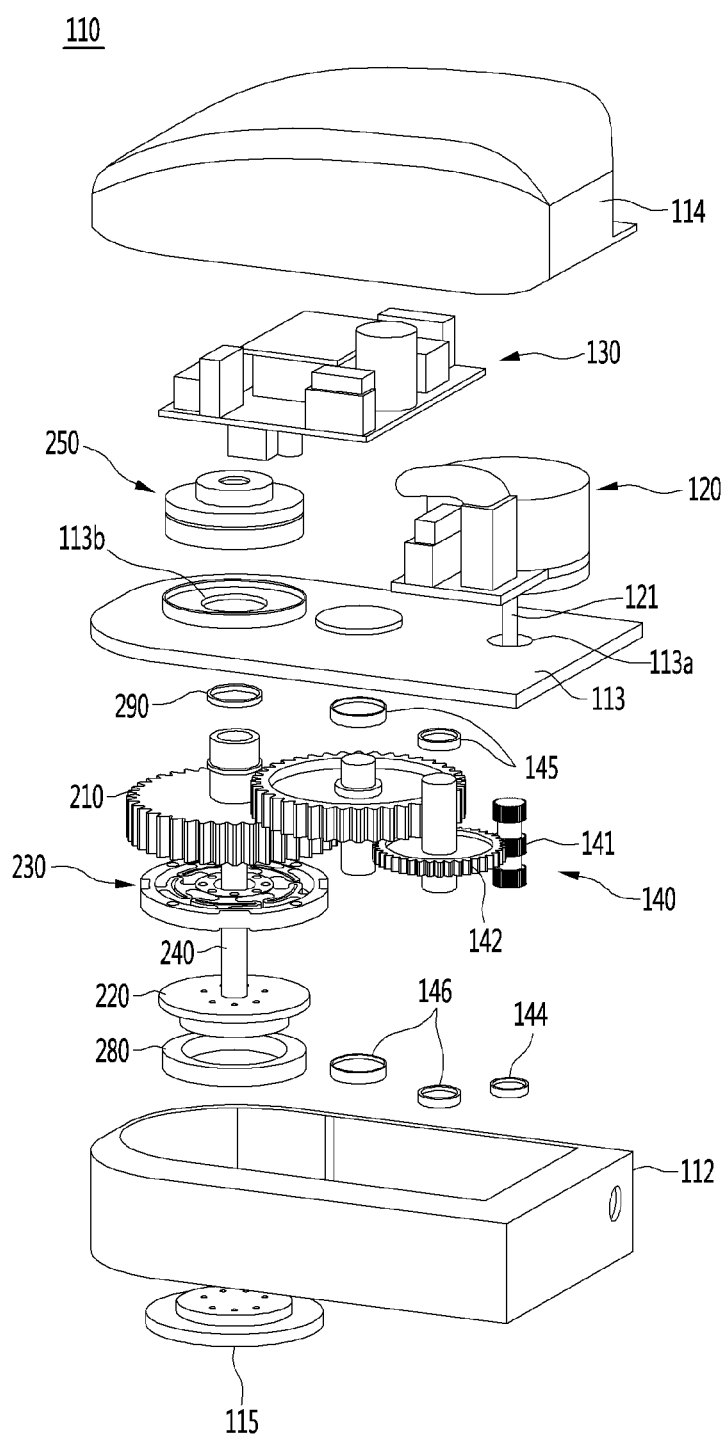
FIG. 7 is an exploded view of the series elastic actuator of FIG. 6.

Ribs 214a may be defined on an outer circumferential surface of the protrusion 214. A bearing 290 (FIG. 7) may be mounted on the outer circumferential surface of the protrusion 214, and the rib 214a may support the bearing 290 in the axial direction of the gear 210. At least a portion of the protrusion 214 may form a bearing mounting portion with the rib 214a.

The elastic body 230 may be made of an alloy material, such as an optimal alloy material having a maximum possible torque capacity at a yield stress or less. For example, the elastic body 230 may be made of stainless steel (SUS) material or a maraging steel material having high rigidity and ductility. As another example, the elastic body 230 may be made of an aluminum alloy, such as a 7000-based aluminum alloy material having high rigidity and low cost and that is easily processed.

The elastic body 230 may include an outer ring 231, an inner ring 232, and a deformation portion or section 233. The outer ring 231 may have a circular ring shape. A center of the outer ring 231 may be located on the rotation axis A of the gear 210 such that the rotation axis A of the gear 210 may pass through the center of the outer ring 231.

A fitting recess 231a into which the fitting portion 212 is fitted may be formed at the outer circumference of the outer ring 231. The outer ring 231 may be fixed to the gear 210 and may rotate together with the gear 210 such that a rotational force of the gear 210 may be transmitted to the outer ring 231 without or reduced loss.

The inner ring 232 may be provided inside the outer ring 231. A diameter of the inner ring 232 may be smaller than a diameter of the outer ring 231. The inner ring 232 and the outer ring 231 may be concentric such that a center of the inner ring 231 may be located on the rotation axis A of the gear 210.

The inner ring 232 may be fastened to the output body 220. The inner ring 232 may be formed with a plurality of connecting holes 239 penetrating parallel to the axial direction and spaced apart from each other by a predetermined interval in the circumferential direction. A fastening member (e.g., a screw or bolt) may be fastened to and penetrate the connecting hole 239 through the output body 220 so that the inner ring 232 may rotate with the output body 220.

An inner hollow portion or an inner protrusion 213 may be provided in the mounting recess 211 of the gear 210 to protrude in the axial direction and be inserted into the inner ring 232. The inner protrusion 213 may have a substantially hollow cylinder shape. The protrusion 214 and inner protrusion 213 may alternatively be referred to as first and second protrusions respectively. The deformation portion 233 may be located between the inner circumference of the outer ring 231 and the outer circumference of the inner ring 232 to connect the outer ring 231 and the inner ring 232. The deformation portion 233 may be elastically deformed by a relative rotation of the outer ring 231 and the inner ring 232.

The deformation portion 233 may be spaced apart from the gear 210 and the output body 220 in the axial direction. The outer ring 231 may be fastened to be in contact with the gear 210 in the axial direction, and the inner ring 232 may be fastened to be in contact with the output body 220 in the axial direction.

A first gap g1 may be formed in the axial direction between the gear 210 and the deformation portion 233, and a second gap g2 may be formed in the axial direction between the output body 220 and the deformation portion 233. During elastic deformation of the deformation portion 233, friction may not occur between the gear 210 or the output body 220 and the deformation portion 233.

The deformation portion 233 may be formed as a tab or curved-shape extension between the inner ring 232 and the outer ring 231. A plurality of deformation portions 233 may be spaced apart from each other by a predetermined interval in the circumferential direction.

Figure 14:
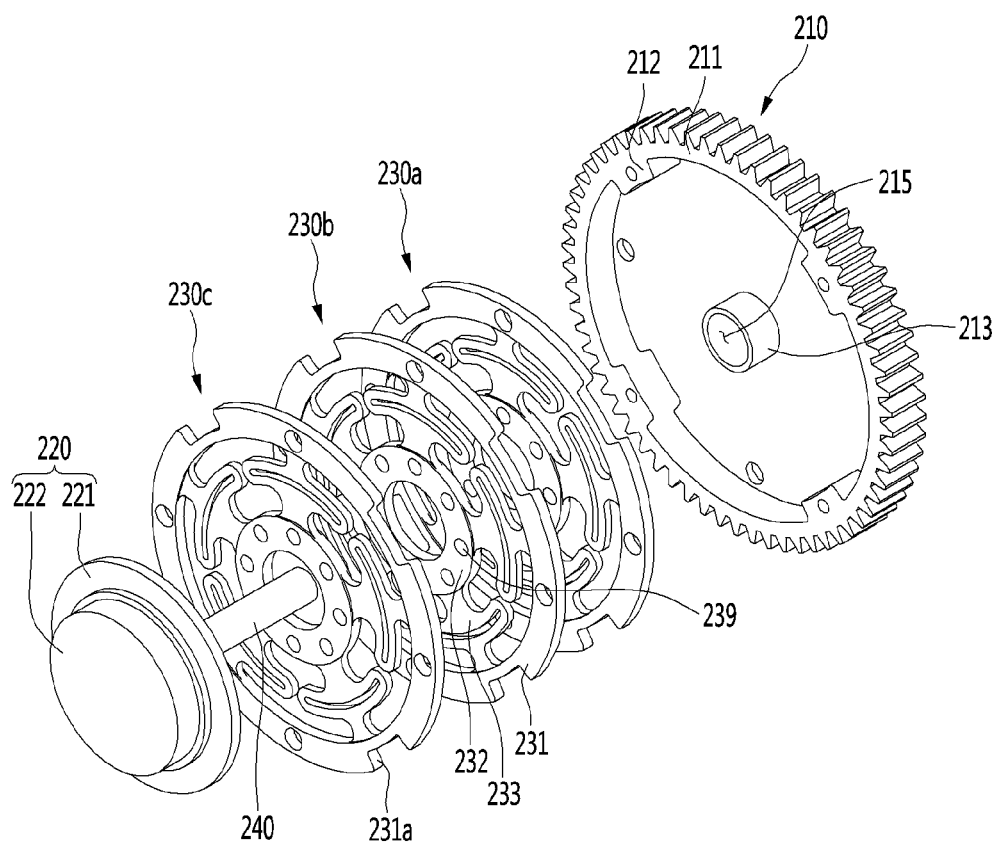
FIG. 14 is an exploded view illustrating an elastic gear module including a plurality of elastic bodies.

Each deformation portion 233 may have a same or similar shape. As shown in FIG. 14, each deformation portion 233 may include an annular or loop portion 234, an outer connecting portion or tab 235, and an inner connecting portion or tab 236.

The annular portion 234 may have a closed loop shape. The annular portion 234 may be located between the outer ring 231 and the inner ring 232 and be spaced apart from the outer ring 231 and the inner ring 232.

The annular portion 234 may be symmetrical with respect to an imaginary line X passing through a center of the outer ring 231 and/or the inner ring 232 and may extend in a radial direction to be perpendicular to and intersect with the rotation axis A of the gear 210. A range of torque capable of elastically deforming the deformation portion 233 may be increased, and a rigidity of the deformation portion 233 may be maintained relatively constant regardless of a rotation direction of the inner ring 232.

The outer connecting portion 235 may connect the annular portion 234 and the outer ring 231, and the inner connecting portion 236 may connect the annular portion 234 and the inner ring 232. The outer connecting portion 235 and the inner connecting portion 236 may extend along the imaginary line X.

The output body 220 may include a large-diameter portion or outer portion 221 and a small-diameter portion or inner protrusion 222. The inner protrusion 222 may protrude in the axial direction from the outer portion 221.

The outer portion 221 may substantially have a disc shape and may be in contact with or adjacent to the elastic body 230. The inner protrusion 222 may protrude from a first surface of the large-diameter portion 221. The bearing 280 (FIG. 7) may be mounted on the outer circumference of the inner protrusion 222. The output bracket 115 (FIG. 7) may be fastened to the inner protrusion 222.

The shaft 240 may be located on the rotation axis of the gear 210 and the output body 220. The gear 210 and the output body 220 may rotate about the shaft 240.

The shaft 240 may be connected to the outer portion 221 of the output body 220. The shaft 240 may extend in a direction perpendicular to the outer portion 221 at a center of the outer portion 221 (i.e., the axial direction). The shaft 240 may pass through the inner ring 232 of the elastic body 230 and the gear 210.

The gear 210 may be formed with a through-portion or hole 215 through which the shaft 240 passes. The through-portion 215 may penetrate the inner protrusion 213 and the protrusion 214 such that an inside of the inner protrusion 213 and an inside of the protrusion 214 may form the through-portion 215.

The shaft 240 may be connected to the angle sensor 250 by sequentially passing through the inner protrusion 213 and the protrusion 214 (i.e., through the through-portion 215) of the gear 210. Since the inner protrusion 213 is inserted into the inner ring 232 of the elastic member 230, the shaft 240 may pass through the inner ring 232 by passing through the through-portion 215.

The elastic gear module 200 may further include bearings 260 and 270 rotatably supporting the shaft 240. The elastic body 230 may be mounted on or provided in the mounting recess 211 formed in the gear 210. A rigidity of the gear 210 and the elastic body 230 with respect to an external force may be weakened as compared with a case where there is no mounting recess 211. The bearings 260 and 270 may reinforce the gear 210 with respect to the external force and may support smooth rotation of the shaft 240.

The bearings 260 and 270 may be radial bearings that contact an outer circumference of the shaft 240 to support the shaft 240 in the radial direction. The bearing 290 (see FIG. 7), which may be mounted on the outer circumference of the protrusion 214 of the gear 210, or the bearing 280, which may be mounted on the outer circumference of the inner protrusion 222 of the output body 220 (see FIG. 7), may be referred to as an outer bearing, and the bearings 260 and 270 supporting the shaft 240 may be referred to as inner bearings.

A type of the bearings 260 and 270 is not limited. For example, the bearings 260 and 270 may be ball bearings or roller bearings.

The gear 210 may be formed with bearing mounting recesses 216 and 217 on which bearings 260 and 270 are mounted. The bearing mounting recesses 216 and 217 may be formed on inner circumferences of the inner protrusion 213 and protrusion 214 to communicate with the through-portion 215. The bearing mounting recesses 216 and 217 may be formed at end portions of the through-portion 215 such that a first bearing mounting recess 216 in which a first bearing 260 may be provided may be formed inside of the inner protrusion 214 and a second bearing mounting recess 217 in which a second bearing 270 may be provided may be formed inside of the protrusion 214.

In first bearing 260 and the second bearing 270 may be spaced apart from each other in the axial direction. The first bearing 260 may be adjacent to the output body 220, and the second bearing 270 may be adjacent to the angle sensor 250.

The first bearing 260 may be mounted on the first bearing mounting recess 216 and the second bearing 270 may be mounted on the second bearing mounting recess 217. The first bearing mounting recess 216 may be formed in the inner circumference of the inner protrusion 213 at an end portion of the inner protrusion 213. The first bearing 260 may include an inner ring that rotates together with the shaft 240, an outer ring fixed to the first bearing mounting recess 216, and a plurality of rolling members (for example, a ball or a roller) located between the inner ring and the outer ring. The second bearing mounting recess 217 may be formed in the inner circumference of the protrusion 214 at an end portion of the protrusion portion 214.

Figure 15:
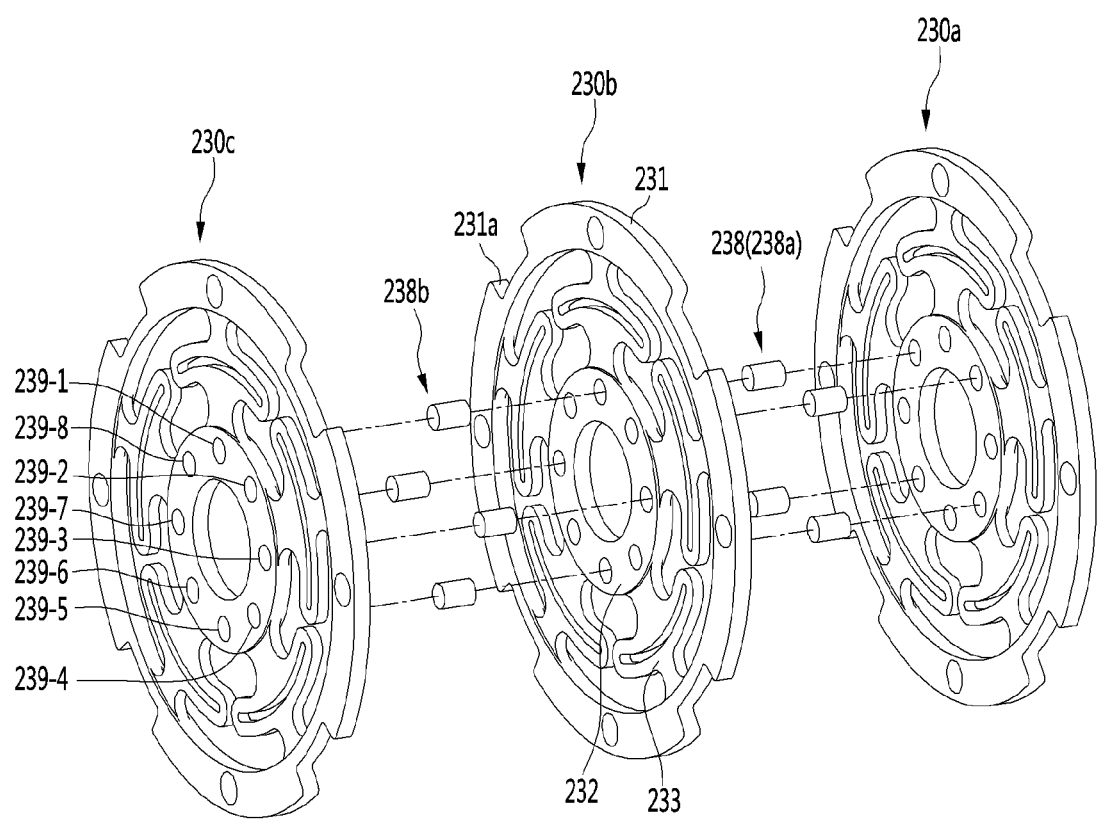
FIG. 15 is a view illustrates a series connection between the plurality of elastic bodies of FIG. 14.
Figure 16:
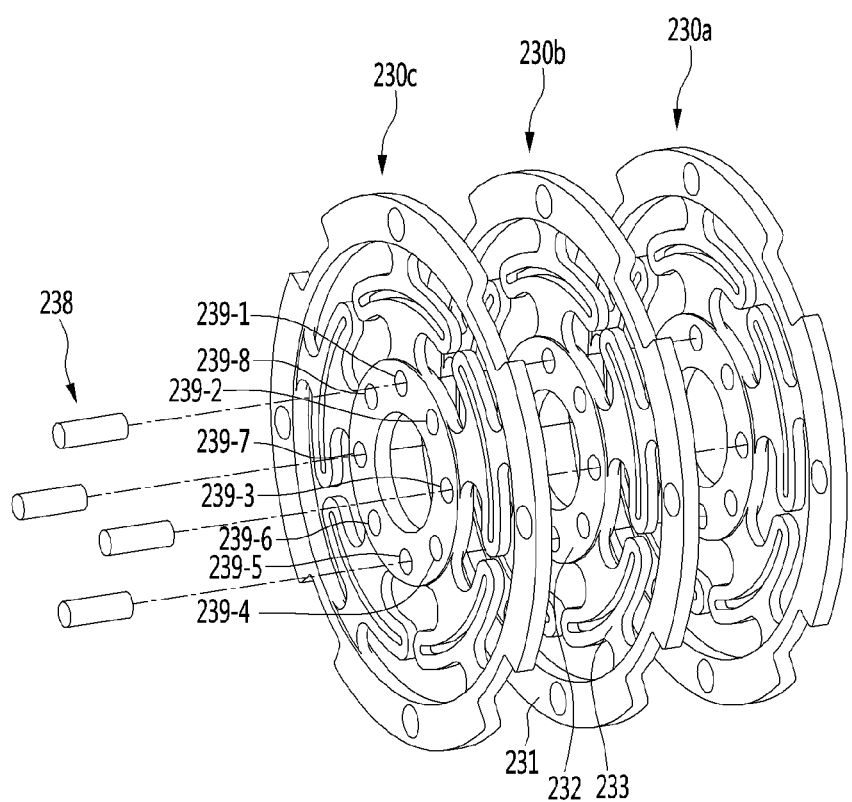
FIG. 16 illustrates a parallel connection between the plurality of elastic bodies illustrated of FIG. 14.

Referring to FIGS. 14-16, the elastic gear module 200 may include a plurality of elastic bodies 230a, 230b, and 230c and a plurality of connecting pins 238 connecting the plurality of elastic bodies 230a, 230b, and 230c to each other. The plurality of elastic bodies 230a, 230b, and 230c may be stacked in the axial direction.

There may be three elastic bodies 230a, 230b, and 230c, but embodiments disclosed herein are not limited to three elastic bodies 230a, 230b, and 230c. In this case, each of the elastic bodies 230a, 230b, and 230c may be referred to as a first elastic body 230a, a second elastic body 230b, and a third elastic body 230c. The first elastic body 230a may be closer to the gear 210, while the third elastic body 230c may be closer to the output body 220.

The plurality of elastic bodies 230a, 230b, and 230c may be received in the mounting recess 211 of the gear 210. The plurality of elastic bodies 230a, 230b, and 230c mounted on the mounting recess 211 may not protrude past the gear 210 in the axial direction, and an assembly of the gear 210 and the plurality of elastic bodies 230a, 230b, and 230c may be compact.

Each outer ring 231 may have a fitting recess 231a into which the fitting portion 212 is pressed-fit. The fitting portion 212 may be tightly fitted into the fitting recesses 231a of the plurality of elastic bodies 230a, 230b, and 230c, respectively. The plurality of elastic bodies 230a, 230b, and 230c and the gear 210 may be fastened to each other without a separate fastening member such as a bolt, screw, etc. In addition, the outer ring 231 of each of the plurality of elastic bodies 230a. 230b, and 230c may be fixed to the gear 210 and may rotate together with the gear 210.

The inner protrusion 213 of the gear 210 may be inserted into the inner ring 232 of the plurality of elastic bodies 230a. 230b, and 230c so that each inner ring 232 of the plurality of elastic bodies 230a. 230b, and 230c may be supported by the inner protrusion 213 in the radial direction.

The plurality of elastic bodies 230a. 230b, and 230c may be connected in series with each other, in parallel, or a combination of series and parallel connection. Each of the inner rings 232 of the plurality of elastic bodies 230a. 230b, and 230c may be connected to each other by a connecting pin 238. The connecting pin 238 may extend in a direction parallel to the axial direction of the gear 210 and may be fitted into a connecting hole 239 formed in the inner ring 232. Each inner ring 232 may be connected to each other while minimizing a gap between the plurality of elastic bodies 230a. 230b, and 230c, and an assembly of the plurality of elastic bodies 230a. 230b, and 230c may be compact.

Some connecting pins 238 may be fitted into some of the plurality of connecting holes 239 formed in the inner ring 232 of the third elastic body 230c. In another portion, a fastening member to fasten the third elastic body 230c with the output body 220 may be connected.

A series connection of the plurality of elastic bodies 230a. 230b, and 230c will be described with reference to FIG. 15. The plurality of connecting pins 238 may include a first connecting pin 238a connecting the second elastic body 230b and the first elastic body 230a, and a second connecting pin 238b connecting the second elastic body 230b with the third elastic body 230c.

The first connecting pin 238a and the second connecting pin 238b may be arranged to alternate with each other in the circumferential direction. The first connecting pin 238a may be fitted into one connecting hole 239 of the plurality of connecting holes 239 formed in the inner ring 232 of the second elastic member 230b, and the second connecting pin 238b may be inserted into another connecting hole 239 adjacent to the one connecting hole 239.

For example, the inner rings 232 of each of the first elastic body 230a, the second elastic body 230b, and the third elastic body 230c may be formed with a first connecting hole 239-1 to an eighth connecting hole 239-8 spaced apart in the circumferential direction. There may be four first connecting pins 238a and four second connecting pins 238b.

The first connecting pins 238a may connect a second connecting hole 239-2, a fourth connecting hole 239-4, a sixth connecting hole 239-6, and the eighth connecting hole 239-8 of the first elastic body 230a and the second elastic body 230b. The second connecting pins 238b may connect a first connecting hole 239-1, a third connecting hole 239-3, a fifth connecting hole 239, and a seventh connecting hole 239-7 of the second elastic body 230b and the third elastic body 230c. A fastening member (e.g., a bold or screw) may be coupled in the second connecting hole 239-2, the fourth connecting hole 239-4, the sixth connecting hole 239-6, and the eighth connecting hole 239-8 of the third elastic body 230c to fasten the output body 220 to the third elastic body 230c.

A parallel connection of the plurality of elastic bodies 230a. 230b, and 230c will be described with reference to FIG. 16. The plurality of connecting pins 238 may connect the first, second, and third elastic bodies 230a. 230b, and 230c by penetrating through corresponding connecting holes 239 of the first, second, and third elastic bodies 230a. 230b, and 230c. Each connecting pin 238 may be longer than the first and second connecting pins 238a and 238b described with reference to FIG. 15, and may simultaneously connect the inner ring 232 of the first elastic member 230a, the inner ring 232 of the second elastic member 230b, and the inner ring 232 of the third elastic member 230c.

For example, the inner ring 232 of each of the first elastic body 230a, the second elastic body 230b, and the third elastic body 230c may be formed with a first connecting hole 239-1 to an eighth connecting hole 239-8 spaced apart in the circumferential direction. Four connecting pins 238 may be provided.

One connecting pin 238 may penetrate the first connecting holes 239-1 of the first elastic body 230a, the second elastic body 230b, and the third elastic body 230c, one connecting pin 239 may penetrate third connecting holes 239-3, one connecting pin 238 may penetrate fifth connecting holes 239-5, and one connecting pni 238 may penetrate seventh connecting holes 239-7 of the first elastic body 230a, the second elastic body 230b, and the third elastic body 230c. A fastening member (e.g., a bolt or screw) may penetrate a second connecting hole 239-2, a fourth connecting hole 239-4, a sixth connecting hole 239-6, and the eighth connecting hole 239-8 of the third elastic body 230c to fasten the third elastic body 230c to the output body 220.

When N elastic bodies 230 having the same elastic rigidity k are connected in series with each other, the combination of N elastic bodies 230 has k/N elastic rigidity. When N elastic bodies 230 having the same elastic rigidity k are connected in parallel to each other, the combination of N elastic bodies 230 has an elastic rigidity of k*N. The elastic rigidity may mean an elastic modulus. Various elastic rigidities may be simply implemented according to a connection method of the plurality of elastic bodies 230a. 230b, and 230c.

Since the outer ring 231 of the elastic body 230 may be fastened to the gear 210 and the inner ring 232 of the elastic body 230 may be fastened to the output body 220, the series elastic actuator 110 may be compact compared to the conventional spring method.

In addition, the rigidity of the elastic body 230 may be easily changed by adjusting a shape and a number of deformation portions 233 of the elastic body 230. The elastic body 230 may be easily designed to have a required rigidity while keeping a size of the elastic body 230 compact.

This application is related to co-pending U.S. application Ser. No. 16/877,687 filed on May 19, 2020 and Ser. No. 16/877,763 filed on May 19, 2020, the entire contents of which are hereby incorporated by reference.

Embodiments disclosed herein may provide an elastic body that may be fastened to a gear and an output body. A rigidity of the elastic body may be easily changed by adjusting a shape and number of deformation portions. Embodiments disclosed herein may provide an elastic body and a series elastic actuator that is compact. The elastic body may be made of stainless alloy material or aluminum alloy material. The rigidity of the elastic body may be increased, processing thereof may be easy, a cost thereof may be low, and a weight thereof may be reduced.

The elastic body may be mounted in a mounting recess or portion defined in the gear. The combination of the gear and the elastic body may be made compact. A fitting portion protruding from an inner circumference of the mounting recess may be fitted into a fitting recess formed on an outer circumference of the outer ring of the elastic body. The gear and the outer ring may rotate together.

The fitting portion and the fitting recess may be tightly fitted so that the gear and the elastic body may be directly fastened. A separate fastening member may not be required.

The deformation portion of the elastic body may be spaced apart from the gear in the axial direction. Friction with the gears may not occur during elastic deformation of the deformation portion.

If a plurality of elastic bodies are fastened to the gear, the plurality of elastic bodies may be connected by a plurality of connecting pins parallel to the axial direction. The assembly of the plurality of elastic bodies may be made compact.

A plurality of elastic bodies may be connected in series, connected in parallel, or a combination of series and parallel connections thereof may be performed. Various elastic rigidity may be simply implemented according to a method of connecting the plurality of elastic bodies.

The above description is merely illustrative of the technical idea of the present disclosure, and those skilled in the art to which the present disclosure pertains may make various modifications and changes without departing from the essential characteristics of the present disclosure.

Embodiments disclosed herein are not intended to limit the technical idea of the present disclosure but are to describe the present disclosure, and the scope of the technical idea of the present disclosure is not limited thereto by these embodiments.

The scope of protection of the present disclosure should be interpreted by the following claims, and all technical ideas within the scope equivalent thereto should be construed as being included in the scope of the present disclosure.

Embodiments disclosed herein may provide a compact series elastic actuator. Embodiments disclosed herein provide a series elastic actuator that is compact and easy to design a necessary rigidity.

Embodiments disclosed herein may be implemented as a series elastic actuator including a gear configured to rotate by a rotational power source, an output body configured to rotate by the gear, and an elastic body connecting the gear and the output body. The elastic body may include an outer ring fastened to the gear, an inner ring positioned inside the outer ring and fastened to the output body, and a deformation portion connecting the outer ring and the inner ring and deforming elastically.

The outer ring and the inner ring of the elastic body may be provided so that centers thereof are provided on a rotation axis of the gear. The deformation portion may include a plurality of deformation portions which are spaced apart from each other in a circumferential direction. The elastic body may be made of a stainless alloy material or aluminum alloy material.

A mounting recess on which the elastic body is mounted may be defined on one surface of the gear. The mounting recess may be provided with an insertion portion inserted into the inner ring of the elastic body. A fitting portion protruding in a radially inward direction may be defined on an inner circumference of the mounting recess, and a fitting recess into which the fitting portion is fitted may be defined on an outer circumference of the outer ring of the elastic body.

The fitting portion and the fitting recess may be tightly fitted to directly fasten the gear and the elastic body. The deformation portion of the elastic body may be spaced apart from the gear in an axial direction. The series elastic actuator may further include a shaft being connected to the output body, passing through the inner ring of the elastic body and the gear, and positioned on a rotation axis of the gear. The gear may be provided with a bearing mounting recess on which a bearing for supporting the shaft in a radial direction is mounted.

Embodiments disclosed herein may be implemented as a series elastic actuator including a gear configured to rotate by a rotational power source, an output body configured to rotate by the gear, and a plurality of elastic bodies including an outer ring, an inner ring located inside the outer ring, and a deformation portion connecting the outer ring and the inner ring to elastically deform. The plurality of elastic bodies may be configured to transmit a rotational force of the gear to the output body. A plurality of connection pins extending in a direction parallel to an axial direction of the gear may connect inner rings of the plurality of elastic bodies to each other.

The inner rings of the elastic bodies may be defined with a plurality of connection holes into which the connection pins are fitted. The plurality of connection holes may be spaced apart by a predetermined interval in the circumferential direction.

The plurality of connection pins may include a first connection pin connecting one elastic body and another elastic body and a second connection pin connecting the one elastic body and yet another elastic body. The first connection pin and the second connection pin may be alternately provided in the circumferential direction. The plurality of connection pins may connect three or more elastic bodies.

Embodiments disclosed herein may be implemented as an elastic actuator comprising a gear configured to transmit a rotational force, an output body configured to rotate by the gear, and at least one elastic body coupling the gear and the output body. The elastic body may include an outer ring coupled to the gear, an inner ring provided radially inside of the outer ring and coupled to the output body, and a midsection connecting the outer ring and the inner ring and configured to be elastically deformed based on at least one of a movement of the outer ring or the inner ring.

Centers of the outer ring and the inner ring may be provided on a rotation axis of the gear. The midsection may include a plurality of sectors spaced apart from each other in a circumferential direction. Each sector may include an annular portion positioned between the outer ring and the inner ring and defining a closed loop, an outer tab extending between the annular portion and the outer ring, and an inner tab extending between the annular portion and the inner ring.

The elastic body may be made of a stainless alloy material or an aluminum alloy material. The elastic body may be made of a maraging steel material or a 7000-based aluminum alloy material.

A mounting recess in which the elastic body is received may be formed on a surface of the gear. The mounting recess may be provided with a protrusion inserted into the inner ring of the elastic body. An inner circumference of the gear may be defined by the mounting recess. A fitting portion may protrude radially inward from the inner circumference of the gear. The elastic body may include a fitting recess formed in an outer circumference of the outer ring. The fitting portion may be configured to be pressed-fit into the fitting recess to secure the elastic body in the mounting recess.

A shaft may be coupled to the output body. The shaft may penetrate through the inner ring of the elastic body and the gear and extend along a rotation axis of the gear. An angle sensor may be coupled to the shaft at a side of the gear opposite to a side of the gear facing the output body. A bearing may support the shaft in a radial direction. The gear may include a bearing mounting recess to receive the bearing.

The at least one elastic body may include a plurality of elastic bodies connected in series. The at least one elastic body may include a plurality of elastic bodies connected in parallel.

Embodiments disclosed herein may be implemented as an elastic actuator comprising a gear configured to transmit a rotational force, an output body configured to rotate by the gear, a plurality of elastic bodies, and a plurality of connecting pins. Each elastic body may include an outer ring, an inner ring provided radially inside the outer ring, and a midsection provided between the outer ring and the inner ring and configured to elastically deform. The plurality of elastic bodies may be configured to transmit the rotational force of the gear to the output body. The plurality of connecting pins may extend in a direction parallel to an axial direction of the gear and connect inner rings of the plurality of elastic bodies to each other.

The gear may be formed with a mounting recess configured to receive the plurality of elastic bodies. An inner circumference of the gear may be defined by the mounting recess, and a fitting portion may protrude radially inward from the inner circumference. Each elastic body may include a fitting recess formed in the outer ring and configured to receive the fitting portion such that the elastic body is secured to the gear via the fitting recess and the fitting portion.

The inner ring of each elastic body may be formed with a plurality of connecting holes into which the connecting pins are fitted. The plurality of connecting holes may be spaced apart by a predetermined interval in a circumferential direction of the inner ring.

The plurality of elastic bodies may include a first elastic body, a second elastic body, and a third elastic body sequentially stacked in an axial direction. The plurality of connecting pins may include a first connecting pin connecting the first elastic body and the second elastic body, and a second connecting pin connecting the second elastic body and the third elastic body. The first connecting pin and the second connecting pin may be arranged to alternate with each other in a circumferential direction of the inner ring of the second elastic body.

Each connecting pin may penetrate three or more elastic bodies to couple the elastic bodies to each other.

When an element is "coupled" or "connected" to another element, it should be understood that a third element may be present between the two elements although the element may be directly coupled or connected to the other element. When an element is "directly coupled" or "directly connected" to another element, it should be understood that no element is present between the two elements.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A series elastic actuator comprising:
a first case;
a second case;
a cover configured to cover an opened surface of the first case and an opened surface of the second case, the cover being configured to partition a space in the first case and the second case;
a gear configured to transmit a rotational force;
an output body configured to be rotated by the gear;
a shaft coupled to the output body and to be rotated by the output body;
at least one elastic body coupling the gear and the output body; and
an angle sensor coupled to the shaft, wherein the shaft is rotated by a torque applied to the at least one elastic body, wherein the angle sensor detects a rotated angle of the shaft,
wherein the angle sensor is disposed between the second case and the cover, and the gear and the output body are disposed between the first case and the cover,
wherein at least one of the at least one elastic body includes:
an outer ring coupled to the gear,
an inner ring provided radially inside of the outer ring and coupled to the output body; and
a midsection connecting the outer ring and the inner ring and configured to be elastically deformed based on movement of at least one of the outer ring or the inner ring.

2. The series elastic actuator of claim 1,
wherein centers of the outer ring and the inner ring are provided on a rotation axis of the gear.

3. The series elastic actuator of claim 1,
wherein the midsection includes a plurality of sectors spaced apart from each other in a circumferential direction.

4. The series elastic actuator of claim 1,
wherein at least one of the elastic body is made of a stainless alloy material or an aluminum alloy material.

5. The series elastic actuator of claim 1,
wherein at least one of the elastic body is made of a maraging steel material or a 7000-based aluminum alloy material.

6. The series elastic actuator of claim 1,
wherein a mounting recess in which at least one of the elastic body is received is formed on a surface of the gear.

7. The series elastic actuator of claim 6,
wherein the mounting recess is provided with a protrusion inserted into the inner ring of at least one of the elastic body.

8. The series elastic actuator of claim 6,
wherein an inner circumference of the gear is defined by the mounting recess, a fitting portion protrudes radially inward from the inner circumference of the gear, at least one of the elastic body includes a fitting recess formed in an outer circumference of the outer ring, and the fitting portion is configured to be pressed-fit into the fitting recess to secure at least one of the elastic body in the mounting recess.

9. The series elastic actuator of claim 1, wherein the shaft penetrates through the inner ring of at least one of the elastic body and the gear, and extends along a rotation axis of the gear.

10. The series elastic actuator of claim 9,
wherein the angle sensor is coupled to the shaft at a side of the gear opposite to a side of the gear facing the output body.

11. The series elastic actuator of claim 10, further comprising a bearing to support the shaft in a radial direction,
wherein the gear includes a bearing mounting recess to receive the bearing.

12. A wearable robot, the robot comprising:
a connecting frame configured to bend forward along an outer contour of a wearer's body;
a couple of movable frames configured to extend downward and forward in a direction toward a wearer's leg; and
the series elastic actuator of claim 1 to connect the connecting frame and at least one of the movable frames,
wherein the at least one elastic body is provided by a plurality of elastic bodies, and
wherein the series elastic actuator is provided with a plurality of connecting pins extending in a direction parallel to an axial direction of the gear and connecting inner rings of the plurality of elastic bodies to each other.

13. The wearable robot of claim 12, wherein the gear is formed with a mounting recess configured to receive the plurality of elastic bodies.

14. The wearable robot of claim 13,
wherein an inner circumference of the gear is defined by the mounting recess, and a fitting portion protrudes radially inward from the inner circumference, and each elastic body includes a fitting recess formed in the outer ring and configured to receive the fitting portion such that the elastic body is secured to the gear via the fitting recess and the fitting portion.

15. The wearable robot of claim 12,
wherein the inner ring of each elastic body is formed with a plurality of connecting holes into which the connecting pins are fitted, the plurality of connecting holes being spaced apart by a predetermined interval in a circumferential direction of the inner ring.

16. The wearable robot of claim 12,
wherein the plurality of elastic bodies includes a first elastic body, a second elastic body, and a third elastic body sequentially stacked in an axial direction, and
wherein the plurality of connecting pins includes:
a first connecting pin connecting the first elastic body and the second elastic body, and
a second connecting pin connecting the second elastic body and the third elastic body,
wherein the first connecting pin and the second connecting pin are arranged to alternate with each other in a circumferential direction of the inner ring of the second elastic body.

17. The wearable robot of claim 12,
wherein each connecting pin penetrates three or more elastic bodies to couple the elastic bodies to each other.

18. The series elastic actuator of claim 1,
wherein the at least one elastic body includes at least three elastic bodies,
wherein a first elastic body and a second elastic body of the least three elastic bodies are connected by a first connecting pin, and the second elastic body and a third elastic body of the least three elastic bodies are connected by a second connecting pin,
wherein the first elastic body and the second elastic body are not connected by the second connecting pin, and the second elastic body and the third elastic body are not connected by the first connecting pin.

19. The series elastic actuator of claim 1, wherein the cover has a first hole through which the shaft passes, and the cover has a second hole through which another shaft of a rotational power source passes.

20. A wearable robot operable by a learned model, the robot comprising:
- a connecting frame configured to bend forward along an outer contour of a wearer's body;
- a couple of movable frames configured to extend downward and forward in a direction toward a wearer's leg; and
- the series elastic actuator of claim 1 to connect the connecting frame and at least one of the movable frames,
- wherein the torque sensed by the angle sensor is used as a learning data of the learned model of the wearable robot.

21. A series elastic actuator comprising:
- a first case;
- a second case;
- a cover configured to cover an opened surface of the first case and an opened surface of the second case, the cover being configured to partition a space in the first case and the second case;
- a gear configured to transmit a rotational force;
- an output body configured to be rotated by the gear;
- a shaft coupled to the output body and to be rotated by the output body;
- at least one elastic body coupling the gear and the output body; and
- an angle sensor coupled to the shaft, wherein the shaft is rotated by a torque applied to the at least one elastic body, wherein the angle sensor detects a rotated angle of the shaft, wherein at least one of the at least one elastic body includes:
- an outer ring coupled to the gear,
- an inner ring provided radially inside of the outer ring and coupled to the output body; and
- a midsection connecting the outer ring and the inner ring and configured to be elastically deformed based on movement of at least one of the outer ring or the inner ring;

wherein the midsection includes:
- an annular portion of a closed-loop shape;
- an outer connecting portion connecting the annular portion and the outer ring; and
- an inner connecting portion connecting the annular portion and the inner ring, and
- wherein the closed loop-shape has an extension portion in an arc direction on a center of the elastic body.

* * * * *